US012654376B2

(12) United States Patent
Horikawa et al.

(10) Patent No.: US 12,654,376 B2
(45) Date of Patent: Jun. 16, 2026

(54) CONTROL DEVICE FOR INDUSTRIAL MACHINE AND CONTROL METHOD FOR INDUSTRIAL MACHINE

(71) Applicant: SUMITOMO HEAVY INDUSTRIES, LTD., Tokyo (JP)

(72) Inventors: Tomonori Horikawa, Chiba (JP); Katsunobu Hano, Chiba (JP); Takuya Matsunaga, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 659 days.

(21) Appl. No.: 18/047,760

(22) Filed: Oct. 19, 2022

(65) Prior Publication Data

US 2023/0125360 A1 Apr. 27, 2023

(30) Foreign Application Priority Data

Oct. 22, 2021 (JP) ................................. 2021-173176

(51) Int. Cl.
*G05B 19/042* (2006.01)
*B29C 45/76* (2006.01)

(52) U.S. Cl.
CPC .......... *B29C 45/768* (2013.01); *G05B 19/042* (2013.01); *B29C 2945/76163* (2013.01); *G05B 2219/2624* (2013.01)

(58) Field of Classification Search
CPC .... G05B 9/03; G05B 19/0428; G05B 19/048; G05B 2219/14014; G05B 2219/14136; G05B 2219/21007; G05B 2219/24186; G05B 2219/2214; G05B 2219/24187; G05B 2219/24195; G05B 2219/24196; G06F 11/2028; G06F 11/2097; G06F 11/2038; G06F 11/1641; G06F 11/1695; G06F 11/2005; G06F 11/2007; G06F 11/184; G06F 11/2033; G06F 11/2041; G06F 11/2046; G06F 11/2051
See application file for complete search history.

(56) References Cited

U.S. PATENT DOCUMENTS

| | | | | |
|---|---|---|---|---|
| 5,136,498 A | * | 8/1992 | McLaughlin | ....... G06F 11/2017 |
| | | | | 714/11 |
| 6,272,386 B1 | * | 8/2001 | McLaughlin | ...... G05B 19/4184 |
| | | | | 700/82 |
| 6,275,741 B1 | | 8/2001 | Choi | |
| 6,351,829 B1 | * | 2/2002 | Dupont | ............... G06F 11/0736 |
| | | | | 714/48 |

(Continued)

FOREIGN PATENT DOCUMENTS

| | | |
|---|---|---|
| DE | 102015012747 | 4/2016 |
| DE | 102004001031 | 11/2022 |

(Continued)

*Primary Examiner* — Darrin D Dunn
(74) *Attorney, Agent, or Firm* — IPUSA, PLLC

(57) ABSTRACT

The present invention is designed to improve safety in the event an anomaly occurs in software. A control device for an industrial machine includes a memory part and a control part. The memory part stores the software for controlling the industrial machine to repeat the molding operations. The control part executes the software at least twice so that a process is performed by each of a plurality of the same software.

13 Claims, 7 Drawing Sheets

(56) References Cited

U.S. PATENT DOCUMENTS

| | | | | |
|---|---|---|---|---|
| 6,411,857 | B1* | 6/2002 | Flood | G06F 11/2038 |
| | | | | 714/E11.08 |
| 6,424,258 | B1* | 7/2002 | Claes | G05B 9/03 |
| | | | | 340/505 |
| 6,988,221 | B2* | 1/2006 | Rasmussen | G06F 11/1443 |
| | | | | 713/375 |
| 7,480,542 | B2* | 1/2009 | Kroeger | B29C 45/1774 |
| | | | | 700/202 |
| 9,195,232 | B1* | 11/2015 | Egnor | B60W 10/20 |
| 11,221,612 | B2* | 1/2022 | Balasubramanian | |
| | | | | H04L 12/4625 |
| 2002/0095221 | A1* | 7/2002 | Cook | G05B 9/03 |
| | | | | 700/14 |
| 2003/0005350 | A1* | 1/2003 | Koning | H04L 69/40 |
| | | | | 714/4.11 |
| 2003/0150909 | A1* | 8/2003 | Markham | G06Q 10/06 |
| | | | | 235/376 |
| 2003/0158795 | A1* | 8/2003 | Markham | G06Q 10/10 |
| | | | | 705/28 |
| 2004/0153700 | A1 | 8/2004 | Nixon et al. | |
| 2005/0240812 | A1* | 10/2005 | Anderson | G06F 11/20 |
| | | | | 714/11 |
| 2007/0038849 | A1* | 2/2007 | Madampath | G06F 11/202 |
| | | | | 712/228 |
| 2007/0164166 | A1* | 7/2007 | Hirvonen | B64C 13/504 |
| | | | | 244/175 |
| 2007/0168058 | A1* | 7/2007 | Kephart | G06F 11/2038 |
| | | | | 714/13 |
| 2008/0072099 | A1* | 3/2008 | Johansson | G06F 11/2097 |
| | | | | 714/1 |
| 2008/0123522 | A1* | 5/2008 | Elliott | H04L 12/403 |
| | | | | 370/220 |
| 2008/0209211 | A1* | 8/2008 | Grgic | G05B 9/03 |
| | | | | 713/166 |
| 2010/0017647 | A1* | 1/2010 | Callaway | G06F 11/1641 |
| | | | | 714/48 |
| 2011/0167298 | A1* | 7/2011 | Lee | G06F 11/2097 |
| | | | | 714/E11.131 |
| 2014/0037779 | A1* | 2/2014 | Olaru | B29C 45/76 |
| | | | | 425/135 |
| 2015/0269038 | A1* | 9/2015 | Perez | G06F 11/2033 |
| | | | | 714/5.1 |
| 2016/0101559 | A1 | 4/2016 | Uchiyama et al. | |
| 2017/0277607 | A1* | 9/2017 | Samii | G06F 11/2033 |
| 2019/0079495 | A1 | 3/2019 | Hirayama et al. | |
| 2020/0310786 | A1* | 10/2020 | Mikhailov | G06F 11/3006 |
| 2021/0387391 | A1* | 12/2021 | Birchmeier | B29C 45/77 |
| 2022/0050451 | A1* | 2/2022 | Stay | G05B 23/0291 |
| 2022/0187841 | A1* | 6/2022 | Ebrahimi Afrouzi | |
| | | | | G05D 1/0274 |
| 2022/0237100 | A1* | 7/2022 | Weise | G05B 23/0289 |

FOREIGN PATENT DOCUMENTS

| | | |
|---|---|---|
| EP | 0518630 | 12/1992 |
| JP | 2002-370266 | 12/2002 |
| JP | 2009-196372 | 9/2009 |
| JP | 2012-208706 | 10/2012 |
| JP | 2019-049917 | 3/2019 |

* cited by examiner

CONTROL DEVICE FOR INDUSTRIAL MACHINE AND CONTROL METHOD FOR INDUSTRIAL MACHINE

CROSS-REFERENCE TO RELATED APPLICATIONS

This application is based on and claims priority to Japanese Patent Application No. 2021-173176, filed on Oct. 22, 2021, the entire contents of which are incorporated herein by reference.

BACKGROUND

1. Field of the Invention

The present invention relates to a control device for an industrial machine and a control method for the industrial machine.

2. Description of the Related Art

Conventionally, there have been industrial machines that manufacture molded products by performing molding operations. With the industrial machines of recent years, software executed in the control device provided in these industrial machines controls the hardware of the industrial machines so as to perform molding operations.

SUMMARY

In situations where software controls hardware, cases might occur in which the software causes the hardware to stop operating. For this reason, it is desired to shorten the software-induced downtime of hardware operation. For example, according to a related-art technique, control programs can be recorded in a plurality of fields, so that, even when one control program is being executed, another control program can be written in, and, after the writing of another program is finished, these control programs are switched. By this means, the above technique of relate art prevents the situation where hardware control stops while the control program is being updated.

Also, considering a case where an anomaly occurs during the execution of software in such industrial machines, a technique of duplicating the software has been proposed. With software that is duplicated in an ordinary manner, the operation of industrial machines is controlled such that, when one software stops due to an anomaly, another software starts operating.

When the operation of industrial machines is controlled by switching software in this way, there is a downtime of hardware operation after one software stops operating, until the other software starts operating. Although such downtime of operation is short, it is undesirable to have a period of time during which the hardware does not operate.

Assuming a case where an anomaly occurs in software, one aspect of the present invention provides a technique for improving safety by shortening the time to switch the software.

A control device for an industrial machine according to one aspect of the present invention includes a memory part and a control part. The memory part stores the software that controls the industrial machine to repeat the molding operations. The control part executes the software at least twice so that a process is performed by each of a plurality of the same software.

According to one aspect of the present invention, it is possible to reduce the time in which no software control is executed, and achieve improved safety.

DESCRIPTION OF EMBODIMENTS

Figure 1:
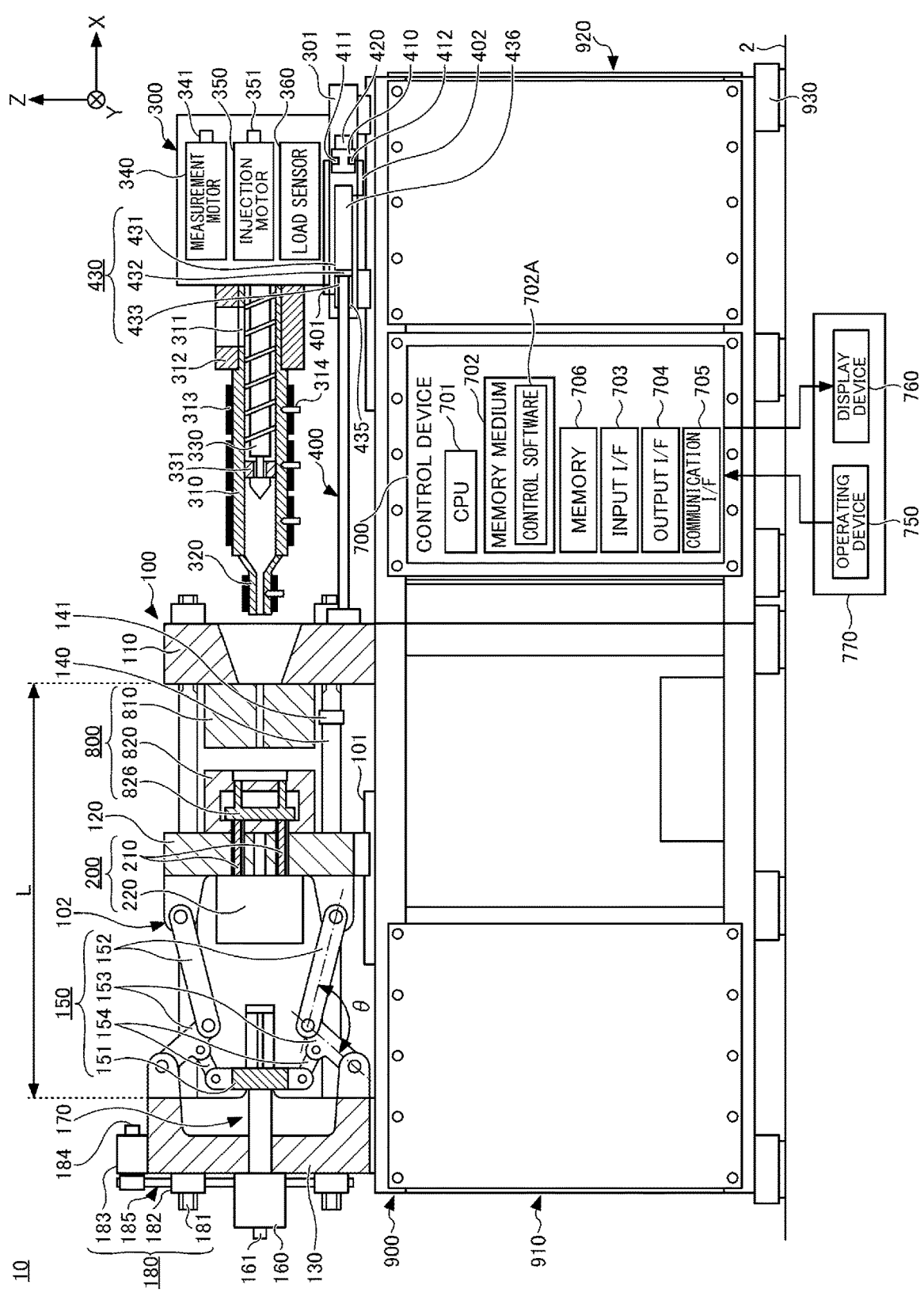
FIG. 1 is a diagram showing a state of an injection molding machine when a mold is fully open according to a first embodiment.

Now, embodiments of the present invention will be described below with reference to the accompanying drawings. Note that, in each drawing, the same or corresponding components will be assigned the same or corresponding reference numerals, and their description may be omitted.

The following embodiments will describe examples in which the present invention is applied to an injection molding machine as an example of an industrial machine that repeats molding operations. Note that the herein-contained embodiments are by no means limited to injection molding machines, but may be applied to any industrial machines that repeat molding operations, such as press machines.

Figure 2:
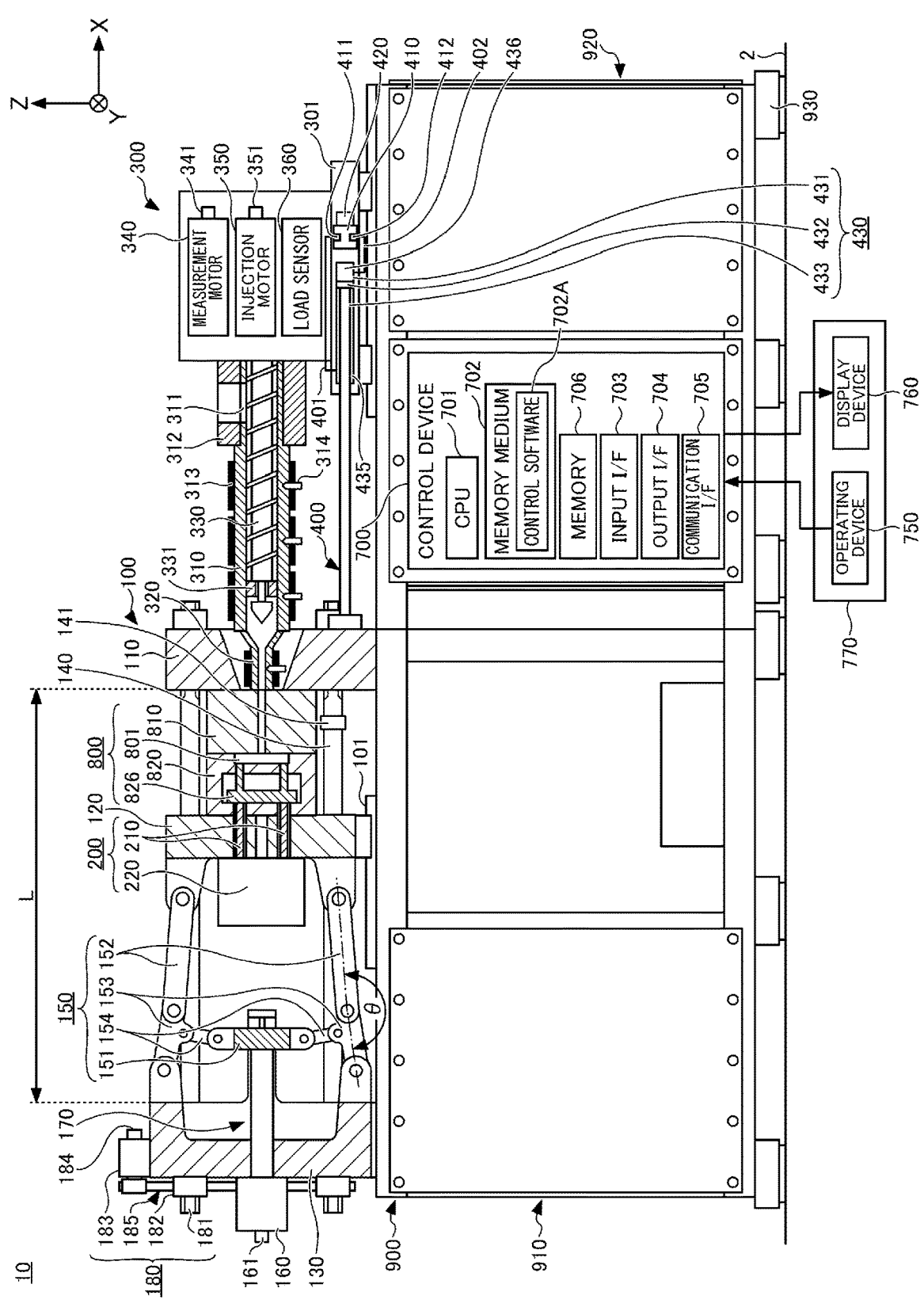
FIG. 2 is a diagram showing a state of the injection molding machine when the mold is clamped according to the first embodiment.

FIG. 1 is a diagram showing a state of an injection molding machine when a mold is fully open, according to the first embodiment. FIG. 2 is a diagram showing the injection molding machine according to the first embodiment, where the mold is clamped. In this specification, the X-axis direction, the Y-axis direction, and the Z-axis direction are directions perpendicular to each other. The X-axis direction and the Y-axis direction represent the horizontal directions, and the Z-axis direction represents the vertical direction. When the clamping device 100 is a horizontal type, the X-axis direction is the direction in which the mold opens and closes, and the Y-axis direction is the width direction of the injection molding machine 10. The negative Y-axis direction side will be hereinafter referred to as "the operating side," and the positive Y-axis direction side will be referred to as "the non-operating side."

As shown in FIG. 1 and FIG. 2, the injection molding machine 10 has: a clamping device 100 that opens and closes a molding device 800; an ejector device 200 that ejects the molded product molded by the molding device 800; an injection device 300 that injects the molding material into the molding device 800; a move device 400 that moves the injection device 300 forward and backward with respect to the molding device 800; a control device 700 that controls each component of the injection molding machine 10; and a frame 900 that supports each component of the injection molding machine 10. The frame 900 includes: a clamping device frame 910 that supports the clamping device 100; and an injection device frame 920 that supports the injection device 300. The clamping device frame 910 and the injection device frame 920 are each installed on a floor 2 via a leveling adjuster 930. The control device 700 is arranged in the inner space of the injection device frame 920. Each component of the injection molding machine 10 will be described below.

(Clamping Device)

In the description of the clamping device 100, the Direction in which the movable platen 120 moves when closing the mold (for example, the positive X-axis direction) will be defined as the front, and the direction in which the movable platen 120 moves when opening the mold (for example, the negative X-axis direction) will be defined as the rear.

The clamping device 100 closes, pressurizes, clamps, depressurizes, and opens the molding device 800. The molding device 800 includes a fixed mold 810 and a movable mold 820. The clamping device 100 is, for example, a horizontal type, and the direction in which the mold opens and closes is the horizontal direction. The clamping device 100 has: a fixed platen 110 to which the fixed mold 810 is attached; a movable platen 120 to which the movable mold 820 is fixed; and a move mechanism 102 for moving the movable platen 120 with respect to the fixed platen 110 in directions in which the mold opens and closes.

A fixed platen 110 is fixed to the clamping device frame 910. A fixed mold 810 is attached to the surface of the fixed platen 110 facing the movable platen 120.

The movable platen 120 is arranged on the clamping device frame 910 so as to be free to move in directions in which the mold opens and closes. A guide 101 for guiding the movable platen 120 is laid on the clamping device frame 910. The movable mold 820 is attached to the surface of the movable platen 120 facing the fixed platen 110.

The move mechanism 102 moves the movable platen 120 forward and backward with respect to the fixed platen 110 to close, thereby pressurizing, clamping, depressurizing, and opening the mold of the molding device 800. The move mechanism 102 has: a toggle support 130 that is arranged at a distance with respect to the fixed platen 110; a tie bar 140 that connects the fixed platen 110 and the toggle support 130; a toggle mechanism 150 that moves the movable platen 120 in directions in which the mold opens and closes, with respect to the toggle support 130; a clamping motor 160 that activates the toggle mechanism 150; a motion conversion mechanism 170 that converts the rotational motion of the clamping motor 160 into linear motion; and a mold thickness adjusting mechanism 180 that adjusts the distance between the fixed platen 110 and the toggle support 130.

The toggle support 130 is provided at a distance from the fixed platen 110, and mounted on the clamping device frame 910 so as to be free to move in directions in which the mold opens and closes. Note that the toggle support 130 may be arranged so as to be free to move along a guide laid on the clamping device frame 910. The guide for the toggle support 130 may be common with the guide 101 for the movable platen 120.

Note that, with the present embodiment, the fixed platen 110 is fixed to the clamping device frame 910, and the toggle support 130 is arranged on the clamping device frame 910 so as to be free to move in directions in which the mold opens and closes. However, it is equally possible to fix the toggle support 130 to the clamping device frame 910, and arrange the fixed platen 110 on the clamping device frame 910 so as to be free to move in directions in which the mold opens and closes.

The tie bar 140 connects the fixed platen 110 and the toggle support 130 with a distance L in directions in which the mold opens and closes. A plurality of (for example, four) tie bars 140 may be used here. The multiple tie bars 140 are arranged parallel to the direction in which the mold opens and closes, and extend in accordance with the clamping force. At least one tie bar 140 may be provided with a tie bar strain sensor 141 that detects the strain of the tie bar 140. The tie-bar strain sensor 141 sends a signal indicating the detection result to the control device 700. The detection result of the tie-bar strain sensor 141 is used to detect the clamping force and the like.

Note that, with the present embodiment, the tie-bar strain sensor 141 is used as a clamping force sensor for detecting the clamping force, but the present invention is by no means limited to this. That is, the clamping force sensor is by no means limited to the strain gauge type, but may be a piezoelectric type, a capacitive type, a hydraulic type, an electromagnetic type, and so forth, and, furthermore, its mounting position is not limited to the tie bar 140 either.

The toggle mechanism 150 is arranged between movable platen 120 and the toggle support 130, and moves the movable platen 120 in directions in which the mold opens and closes, with respect to the toggle support 130. The toggle mechanism 150 has a crosshead 151 that moves in directions in which the mold opens and closes, and a pair of link sets that bend and stretch as the crosshead 151 moves. Each set of links include first links 152 and second links 153 which are connected by using pins or the like so as to be free to bend and stretch. The first links 152 are attached to the movable platen 120 with pins or the like so as to be free to swing. The second links 153 are attached to the toggle support 130 with pins or the like so as to be free to swing. The second links 153 are attached to the crosshead 151 via third links 154. When the crosshead 151 is moved forward or backward with respect to the toggle support 130, the first links 152 and the second links 153 bend and stretch, and the movable platen 120 moves forward or backward with respect to the toggle support 130.

Note that the configuration of the toggle mechanism 150 is by no means limited to the configurations shown in FIG. 1 and FIG. 2. For example, although the number of nodes in each set of links is five in FIG. 1 and FIG. 2, this may be four, and one end part of the third link 154 may be connected to a node between a first link 152 and a second link 153.

A clamping motor 160 is attached to the toggle support 130 to activate the toggle mechanism 150. The clamping motor 160 moves the crosshead 151 forward and backward with respect to the toggle support 130, thereby making the first links 152 and the second links 153 bend and stretch, and allowing the movable platen 120 to move forward and backward with respect to the toggle support 130. The clamping motor 160 is directly connected to the motion conversion mechanism 170, but may be connected to the motion conversion mechanism 170 via a belt, a pulley and the like.

The motion conversion mechanism 170 converts the rotational motion of the clamping motor 160 into linear motion of the crosshead 151. The motion conversion mechanism 170 includes a screw shaft, and a screw nut that is screwed into the screw shaft. A ball or a roller may be interposed between the screw shaft and the screw nut.

The clamping device 100 performs a mold-closing step, a pressurizing step, a clamping step, a depressurizing step, a mold-opening step, and so forth, under the control of the control device 700.

In the mold-closing step, the clamping motor 160 is driven to move the crosshead 151 forward at a configured moving speed, to the position where the mold is closed completely, thereby moving the movable platen 120 forward and making the movable mold 820 touch the fixed mold 810. The position and moving speed of the crosshead 151 are detected by using, for example, a clamping motor encoder 161 or the like. The clamping motor encoder 161 detects the rotation of the clamping motor 160, and sends a signal indicating the detection result, to the control device 700.

Note that, as for the crosshead position sensor for detecting the position of the crosshead 151 and the crosshead speed sensor for detecting the moving speed of the crosshead 151, these are by no means limited to the clamping motor encoder 161, and more general ones can be used. Also, as for the movable platen position sensor for detecting the position of the movable platen 120 and the movable platen speed sensor for detecting the moving speed of the movable platen 120, these are by no means limited to the clamping motor encoder 161, and more general ones can be used.

In the pressurizing step, the clamping motor 160 is further driven to move the crosshead 151 farther forward from the position where the mold is closed completely, to the clamping position, thereby generating a clamping force.

In the clamping step, the clamping motor 160 is driven to keep the crosshead 151 at the clamping position. In the clamping step, the clamping force generated in the pressurizing step is maintained. In the clamping step, a cavity space 801 (see FIG. 2) is formed between the movable mold 820 and the fixed mold 810, and the injection device 300 fills the cavity space 801 with the liquid molding material. A molded product is gained as the filled molding material solidifies.

There may be one cavity space 801 or multiple cavity spaces 801. In the latter case, a plurality of molded products can be gained at a time. An insert material may be placed in one part of the cavity space 801, and another part of the cavity space 801 may be filled with the molding material. By this means, a molded product in which the insert material and the molding material are integrated can be gained.

In the de-pressurizing step, the clamping motor 160 is driven to move the crosshead 151 backward from the clamping position to the position where the mold starts opening, thereby moving the movable platen 120 backward and reducing the clamping force. The position where the mold starts opening and the position where the mold is completely closed may be the same position.

In the mold-opening step, the clamping motor 160 is driven to move the crosshead 151 backward, at a configured moving speed, from the position where the mold starts opening to the position where the mold is fully open, thereby moving the movable platen 120 backward and separating the movable mold 820 from the fixed mold 810. Subsequently, the ejector device 200 ejects the molded product from the movable mold 820.

The settings in the mold-opening step, the pressurizing step, and the clamping step are configured together as a series of settings. For example, the moving speed, the position, and the clamping force of the crosshead 151 in the mold-opening step and the pressurizing step (including the position where the mold starts closing, the position where the moving speed is switched, the position where the mold is completely closed, and the clamping position) are configured together as a series of settings. The position where the mold starts closing, the position where the moving speed is switched, the position where the mold is completely closed, and the clamping position are arrayed in this order, from the rear to the front, and represent the starting and ending points of sections where the moving speed is configured. The moving speed is configured per section. There may be one position to switch the moving speed, or there may be a number of positions to switch the moving speed. The position to switch the moving speed need not be configured. Either one of the clamping position and the clamping force may be configured.

The settings in the de-pressurizing step and the mold-opening step are configured similarly. For example, the moving speed and the position of the crosshead 151 in the de-pressurizing step and the mold-opening step (including the position where the mold starts opening, the position where the moving speed is switched, and the position where the mold is fully open) are configured together as a series of settings. The position where the mold starts opening, the position where the moving speed is switched, and the position where the mold is fully open are arrayed in this order, from the front to the rear, and represent the starting and ending points of sections where the moving speed is configured. The moving speed is configured per section. There may be one position to switch the moving speed, or there may be a number of positions to switch the moving speed. The position to switch the moving speed need not be configured. The position where the mold starts opening and the position where the mold is completely closed may be the same position. Also, the position where the mold is fully open and the position where the mold begins to close may be the same position.

Note that, instead of the moving speed and the position of the crosshead 151, the moving speed and the position of the movable platen 120 may be configured. Also, the clamping force may be configured instead of the position of the crosshead (for example, the clamping position) or the position of the movable platen.

Now, the toggle mechanism 150 amplifies the driving force of the clamping motor 160 and sends this to the movable platen 120. This rate of this magnification is also referred to as "toggle magnification." The toggle magnification changes according to an angle θ that is formed between the first link 152 and the second link 153 (hereinafter also referred to as "link angle θ"). Link angle can be determined from the position of the crosshead 151. The toggle magnification becomes the largest when link angle θ is 180 degrees.

When the thickness of the molding device 800 changes due to replacement of the molding device 800 or a change in the temperature of the molding device 800, the thickness of the mold is adjusted so that a predetermined clamping force can be gained when clamping the mold. In adjusting the thickness of the mold, for example, the distance L between the fixed platen 110 and the toggle support 130 is adjusted such that link angle θ in the toggle mechanism 150 becomes a predetermined angle upon mold touch, which is when the movable mold 820 touches the fixed mold 810.

The clamping device 100 has a mold thickness adjusting mechanism 180. The mold thickness adjusting mechanism 180 adjusts the mold's thickness by adjusting the distance L between the fixed platen 110 and the toggle support 130. Note that the time for adjusting the mold's thickness is provided, for example, between the end of a molding cycle and the start of the next molding cycle. The mold thickness adjusting mechanism 180 has, for example: a screw shaft

181 that is formed in the rear end part of the tie bar 140; a screw nut 182 that is held by the toggle support 130 so as to be free to rotate and unable to move forward and backward; and a mold-thickness adjusting motor 183 that rotates the screw nut 182 that is screwed into the screw shaft 181.

A screw shaft 181 and a screw nut 182 are provided for each tie bar 140. The rotational driving force of the mold-thickness adjusting motor 183 may be transmitted to a plurality of screw nuts 182 via a rotational drive force transmission part 185. These screw nuts 182 can rotate synchronously. Note that it is also possible to rotate multiple screw nuts 182 individually by changing the transmission path of the rotational drive force transmission part 185.

The rotational drive force transmission part 185 may be composed of, for example, gears and the like. In this case, passive gears are formed on the outer periphery of each screw nut 182, a drive gear is attached to the output shaft of the mold-thickness adjusting motor 183, and an intermediate gear that meshes with a plurality of passive gears and drive gears is rotatably held in the center part of the toggle support 130. Note that the rotational drive force transmission part 185 may be composed of belts, pulleys, or the like, instead of gears.

The operation of the mold thickness adjusting mechanism 180 is controlled by the control device 700. The control device 700 drives the mold-thickness adjusting motor 183 to rotate the screw nut 182. As a result of this, the position of the toggle support 130 with respect to the tie bar 140 is adjusted, and the distance L between the fixed platen 110 and the toggle support 130 is adjusted. Note that multiple mold thickness adjusting mechanisms may be used in combination.

The distance L is detected using the mold-thickness adjusting motor encoder 184. The mold-thickness adjusting motor encoder 184 detects the amount of rotation, the direction of rotation, and so forth of the mold-thickness adjusting motor 183, and sends signals indicating these detection results to the control device 700. The detection results of the mold-thickness adjusting motor encoder 184 are used to monitor and control the position of the toggle support 130 and the distance L. Note that the toggle support position sensor for detecting the position of the toggle support 130 and the distance sensor for detecting the distance L are by no means limited to the mold-thickness adjusting motor encoder 184, and more general ones can be used.

The clamping device 100 may have a metallic mold temperature adjustor for adjusting the temperature of the molding device 800. The molding device 800 has, in its inside, a channel for a temperature control medium. The metallic mold temperature adjustor adjusts the temperature of the molding device 800 by adjusting the temperature of the temperature control medium supplied to the channel in the molding device 800.

Note that, although the clamping device 100 of this embodiment is a horizontal type in which the mold opens and closes horizontally, the clamping device 100 may also be a vertical type in which the mold opens and closes vertically.

Also, although the clamping motor 160 serves as a drive source in the clamping device 100 of this embodiment, an oil-pressure cylinder may be provided instead of the clamping motor 160. Also, the clamping device 100 may have a linear motor for opening and closing the mold and an electromagnet for clamping the mold.

(Ejector Device)

In the description of the ejector device 200, as in the description of the clamping device 100, the direction in which the movable platen 120 moves when closing the mold (for example, the positive X-axis direction) is defined as the front, and the direction in which the movable platen 120 moves when opening the mold (for example, the negative X-axis direction) is defined as the rear.

The ejector device 200 is attached to the movable platen 120, and moves forward and backward with the movable platen 120. The ejector device 200 has: an ejector rod 210 for ejecting the molded product from the molding device 800; and a drive mechanism 220 for moving the ejector rod 210 in the direction in which the movable platen 120 moves (the X-axis direction).

The ejector rod 210 is disposed in a through-hole of the movable platen 120 so as to be free to move forward and backward. The front end part of the ejector rod 210 contacts the ejector plate 826 of the movable mold 820. The front end part of the ejector rod 210 may or may not be connected with the ejector plate 826.

The drive mechanism 220 includes, for example: an ejector motor; and a motion conversion mechanism that converts the rotational motion of the ejector motor into linear motion of the ejector rod 210. The motion conversion mechanism includes a screw shaft and a screw nut that is screwed into the screw shaft. A ball or a roller may be interposed between the screw shaft and the screw nut.

The ejector device 200 performs an ejection step under the control of the control device 700. In the ejection step, the ejector rod 210 is moved from the standby position to the ejection position at a configured moving speed, thereby moving the ejector plate 826 forward and ejecting the molded product. Subsequently, the ejector motor is driven to move the ejector rod 210 backward at a configured moving speed, and the ejector plate 826 is moved backward to the original standby position.

The position and moving speed of the ejector rod 210 are detected by using, for example, an ejector motor encoder. The ejector motor encoder detects the rotation of the ejector motor and sends a signal indicating the detection result to the control device 700. Note that the ejector rod position sensor for detecting the position of the ejector rod 210 and the ejector rod moving speed sensor for detecting the moving speed of the ejector rod 210 are by no means limited to an ejector motor encoder, and more general ones can be used.

(Injection Device)

In the following description of the injection device 300, unlike the description of the clamping device 100 and the description of the ejector device 200, the direction in which the screw 330 moves during filling (for example, the negative X-axis direction) will be defined as the front, and the direction in which the screw 330 moves during measurement (for example, the positive X-axis direction) will be defined as the rear.

The injection device 300 is installed on a sliding base 301. The sliding base 301 is arranged so as to be free to move forward and backward with respect to the injection device frame 920. The injection device 300 is arranged to be free to move forward and backward with respect to the molding device 800. The injection device 300 touches the molding device 800, and fills the cavity space 801 in the molding device 800 with the molding material measured in the cylinder 310. The injection device 300 has, for example: a cylinder 310 that heats the molding material; a nozzle 320 provided at the front end part of the cylinder 310; a screw 330 arranged inside the cylinder 310 so as to be free to move forward and backward and free to rotate; a measurement motor 340 that rotates the screw 330; an injection motor 350 that moves the screw 330 forward and backward; and a load sensor 360 that detects the load transmitted between the injection motor 350 and the screw 330.

The cylinder 310 heats the molding material supplied inside from a supply port 311. The molding material includes, for example, a resin or the like. The molding material is, for example, formed in pellets, and supplied to the supply port 311 in a solid state. The supply port 311 is formed in the rear part of the cylinder 310. A cooler 312, such as a water-cooled cylinder, is provided in the outer periphery of the rear part of the cylinder 310. A heater 313, such as a band heater and a temperature sensor 314, are provided in the outer periphery of the cylinder 310, on the front side of the cooler 312.

The cylinder 310 is divided into a plurality of zones in the axial direction (for example, the X-axis direction) of the cylinder 310. A heater 313 and a temperature sensor 314 are provided in each of these multiple zones. A setting temperature is configured in each zone, and the control device 700 controls the heater 313 such that the temperature detected by the temperature sensor 314 is the setting temperature.

The nozzle 320 is provided at the front end part of the cylinder 310 and pressed against the molding device 800. The heater 313 and the temperature sensor 314 are provided in the outer periphery of the nozzle 320. The control device 700 controls the heater 313 such that the detected temperature of the nozzle 320 is the setting temperature.

The screw 330 is provided in the cylinder 310 such that the screw 330 is free to rotate and free to move forward and backward. When the screw 330 rotates, the molding material is sent forward following the spiral threads of the screw 330. The molding material, while being sent forward, is melted gradually by the heat from the cylinder 310. As the liquid molding material is sent in front of the screw 330 and accumulated in front of the cylinder 310, the screw 330 moves backward. Subsequently, when the screw 330 moves forward, the liquid molding material accumulated in front of the screw 330 is injected from the nozzle 320 and fills the inside of the molding device 800.

A backflow preventing ring 331 is attached to the front part of the screw 330 such that the backflow preventing ring 331 is free to move forward and backward. The backflow preventing ring 331 serves as a backflow preventing valve for preventing the backflow of the molding material when the screw 330 is pushed forward and the molding material is sent from the front to the rear.

When the screw 330 moves forward, the backflow preventing ring 331 is pushed backward by the pressure of the molding material that is located in front of the screw 330, and moves backward relative to the screw 330, to a blocking position (see FIG. 2) where the backflow preventing ring 331 blocks the channel of the molding material. By this means, the molding material accumulated in front of the screw 330 is prevented from flowing backward.

Meanwhile, when the screw 330 is rotated, the backflow preventing ring 331 is pushed forward by the pressure of the molding material that is sent forward along the spiral threads of the screw 330, and moves forward relative to the screw 330 up to the open position, which is where the channel for the molding material opens up (see FIG. 1). By this means, the molding material is sent to the front side of the screw 330.

The backflow preventing ring 331 may be either a co-rotating type that rotates with the screw 330 or a non-co-rotating type that does not rotate with the screw 330.

Note that the injection device 300 may have a drive source that makes the backflow preventing ring 331 move forward and backward between the open position and the closing position, with respect to the screw 330.

The measurement motor 340 makes the screw 330 rotate. The drive source for rotating the screw 330 is by no means limited to the measurement motor 340, and may be, for example, an oil-pressure pump or the like.

The injection motor 350 makes the screw 330 move forward and backward. Between the injection motor 350 and the screw 330, a motion conversion mechanism for converting the rotational motion of the injection motor 350 into linear motion of the screw 330, and the like are provided. The motion conversion mechanism has, for example, a screw shaft, and a screw nut that is screwed into the screw shaft. A ball, a roller, or the like may be provided between the screw shaft and the screw nut. The drive source for making the screw 330 move forward and backward is by no means limited to the injection motor 350, and, for example, an oil-pressure cylinder or the like may be used.

The load sensor 360 detects the load that is transmitted between the injection motor 350 and the screw 330. The detected load is converted into pressure in the control device 700. The load sensor 360 is provided on the transmission path of load between the injection motor 350 and the screw 330, and detects the load that acts on the load sensor 360.

The load sensor 360 sends a signal indicating the detection result to the control device 700. The load detected by the load sensor 360 is converted into pressure that acts between the screw 330 and the molding material, and used to control or monitor the pressure the screw 330 receives from the molding material, the back pressure upon the screw 330, the pressure acting on the molding material from the screw 330, and so forth.

Note that the pressure sensor for detecting the pressure of the molding material is by no means limited to the load sensor 360, and more general ones can be used as well. For example, a nozzle-pressure sensor or a mold inner pressure sensor may be used. The nozzle-pressure sensor may installed in the nozzle 320. The mold inner pressure sensor may be installed in the molding device 800.

The injection device 300 performs a measurement step, a filling step, a pressure-holding step, and so forth, under the control of the control device 700. The filling step and the pressure-holding step may be also collectively referred to as an "injection step."

In the measurement step, the measurement motor 340 is driven to rotate the screw 330 at a configured number of rotations per unit time, and the molding material is sent forward following the spiral threads of the screw 330. Accompanying this, the molding material melts gradually. As the liquid molding material is sent in front of the screw 330 and accumulated in front of the cylinder 310, the screw 330 moves backward. The number of rotations of the screw 330 per unit time is detected by using, for example, a measurement motor encoder 341. The measurement motor encoder 341 detects the rotation of the measurement motor 340, and sends a signal indicating the detection result to the control device 700. Note that the screw rotation speed sensor for detecting the number of rotations of the screw 330 per unit time is by no means limited to the measurement motor encoder 341, and more general ones can be used as well.

In the measurement step, the injection motor 350 may be driven to apply a setting back pressure to the screw 330, so as to prevent the screw 330 from moving backward all too suddenly. The back pressure upon the screw 330 is detected by using, for example, the load sensor 360. When the screw 330 moves back to the position where the measurement ends and a predetermined amount of molding material is accumulated in front of the screw 330, the measurement step is completed.

The position and number of rotations of the screw 330 per unit time are configured together as a series of settings. For example, the position where the measurement is started, the position where the number of rotations per unit time is switched, and the position where the measurement is completed are configured. These positions are arrayed in this order from the front to the rear, and represent the starting points and the ending points of sections where the number of rotations per unit time is configured. The number of rotations per unit time is configured per section. The number of rotations per unit time may be switched at one position or may be switched at a number of positions. The position to switch the number of rotations per unit need not be configured. Also, the back pressure is configured per section.

In the filling step, the injection motor 350 is driven to move the screw 330 forward at a configured moving speed. The cavity space 14 in the molding device 800 is filled with the liquid molding material accumulated in front of the screw 330. The position and moving speed of the screw 330 are detected by using, for example, an injection motor encoder 351. The injection motor encoder 351 detects the rotation of the injection motor 350 and sends a signal indicating the detection result to the control device 700. When the position of the screw 330 reaches a setting position, the filling step switches to the pressure-holding step (this switch is commonly referred to as "V/P switchover"). The position where V/P switchover takes place is also referred to as the "V/P switchover position." The configured moving speed of the screw 330 may be changed depending on the position of the screw 330, the time, and so forth.

The position and the moving speed of the screw 330 in the filling step are configured together as a series of settings. For example, the position where the filling is started (also referred to as "the injection-starting position"), the position to switch the moving speed, and the V/P switchover position are configured. These positions are arranged in this order, from the rear to the front, and represent the starting points and ending points of sections where the moving speed is configured. The moving speed is configured per section. The moving speed may be switched at one position or may be switched at a number of positions. The position to switch the moving speed need not be configured.

In every section in which the moving speed of the screw 330 is configured, the upper limit value of pressure for the screw 330 is configured. The pressure of the screw 330 is detected by the load sensor 360. When the pressure of the screw 330 is less than or equal to the setting pressure, the screw 330 is moved forward at the configured moving speed. On the other hand, when the pressure of the screw 330 is greater than the setting pressure, the screw 330 is moved forward at a moving speed slower than the configured moving speed, such that the pressure of the screw 330 becomes less than or equal to the setting pressure, in order to protect the mold.

Note that, when the position of the screw 330 arrives at the V/P switchover position during the filling step, the screw 330 maybe stopped temporarily at the V/P switchover position, and V/P switchover may be carried out later. Shortly before the V/P switchover, the screw 330 may be moved forward or backward at a low speed, instead of stopping. Also, as for the screw position sensor for detecting the position of the screw 330 and the screw moving speed sensor for detecting the moving speed of the screw 330, these are by no means limited to the injection motor encoder 351, and more general ones can be used.

In the pressure-holding step, the injection motor 350 is driven to push the screw 330 forward, the pressure on the molding material in the front end part of the screw 330 (hereinafter also referred to as the "holding pressure") is kept at a configured pressure, and the molding material that remains in the cylinder 310 is pushed towards the molding device 800. By this means, the shortage of the molding material due to cooling-induced contraction inside the molding device 800 can be replenished. The holding pressure is detected by using, for example, the load sensor 360. The setting value of holding pressure may be changed according to the time that has elapsed since the start of the pressure-holding step, and so forth. The holding pressure and the time to keep the holding pressure in the pressure-holding step may be configured multiple in number, and may be configured together as a series of settings.

In the pressure-holding step, the molding material in the cavity space 14 in the molding device 800 is gradually cooled, and, when the pressure-holding step is completed, the inlet of the cavity space 14 is sealed with the solidified molding material. This state is referred to as "gate seal," and the backflow of the molding material from the cavity space 14 is prevented therewith. After the pressure-holding step, the cooling step is started. In the cooling step, the molding material in the cavity space 14 is solidified. The measurement step may be performed during the cooling step, so as to reduce the time cycle of molding.

Note that, although the injection device 300 of this embodiment employs an in-line screw method, a pre-plunger method or the like may be employed as well. The pre-plunger-type injection device supplies the molding material melted in a plasticized cylinder, to an injection cylinder, and injects the molding material from the injection cylinder into the molding device. A screw is provided in the plasticized cylinder so as to be free to rotate, or free to rotate and move forward and backward. Meanwhile, a plunger is provided inside the injection cylinder, free to move forward and backward.

Also, although the injection device 300 of this embodiment is a horizontal type in which the axial direction of the cylinder 310 is horizontal, the injection device 300 may be a vertical type in which the axial direction of the cylinder 310 is vertical. The clamping device to be combined with a vertical injection device 300 may be vertical or horizontal. Similarly, the clamping device to be combined with a horizontal injection device 300 may be horizontal or vertical.

(Move Device)

In the description of the move device 400, as in the above description of the injection device 300, the direction in which the screw 330 moves during filling (for example, the negative X-axis direction) is the front, and the direction in which the screw 330 moves during measurement (for example, the positive X-axis direction) is the rear.

The move device 400 allows the injection device 300 to move forward or backward with respect to the molding device 800. Also, the move device 400 presses the nozzle 320 against the molding device 800 to generate a nozzle touch pressure. The move device 400 includes: a liquid-pressure pump 410; a motor 420 to serve as a drive source; a liquid-pressure cylinder 430 to serve as a liquid-pressure actuator; and so forth.

The liquid-pressure pump 410 has a first port 411 and a second port 412. The liquid-pressure pump 410 is a pump that can rotate in both directions, and, by switching the direction of rotation of the motor 420, the liquid-pressure pump 410 sucks in the hydraulic fluid (for example, oil) from one of the first port 411 and the second port 412 and discharges it from the other one, thereby generating a hydraulic pressure. The liquid-pressure pump 410 can also suck in the hydraulic fluid from a tank and discharge it from one of the first port 411 or the second port 412.

The motor 420 makes the liquid-pressure pump 410 operate. The motor 420 drives the liquid-pressure pump 410 in the rotation direction, and with rotation torque, in accordance with control signals from the control device 700. The motor 420 may be an electric motor or an electric servo motor.

The liquid-pressure cylinder 430 has a cylinder body 431, a piston 432, and a piston rod 433. The cylinder body 431 is fixed to the injection device 300. The piston 432 divides the inside of the cylinder body 431 into a front chamber 435 that serves as a first chamber, and a rear chamber 436 that serves as a second chamber. The piston rod 433 is fixed to the fixed platen 110.

The front chamber 435 of the liquid-pressure cylinder 430 is connected with the first port 411 of the liquid-pressure pump 410 via a first channel 401. The hydraulic fluid discharged from the first port 411 is supplied to the front chamber 435 via the first channel 401, so that the injection device 300 is pushed forward. As the injection device 300 moves forward, the nozzle 320 is pressed against the fixed mold 810. The front chamber 435 functions as a pressure chamber that generates a nozzle touch pressure of the nozzle 320 by using the pressure of the hydraulic fluid supplied from the liquid-pressure pump 410.

Meanwhile, the rear chamber 436 of the liquid-pressure cylinder 430 is connected with the second port 412 of the liquid-pressure pump 410 via a second channel 402. The hydraulic fluid discharged from the second port 412 is supplied to the rear chamber 436 of the liquid-pressure cylinder 430 via the second channel 402, so that the injection device 300 is pushed backward. As the injection device 300 moves backward, the nozzle 320 is separated from the fixed mold 810.

Note that, although the move device 400 according to the present embodiment includes the liquid-pressure cylinder 430, the present invention is by no means limited to this. For example, it is possible to use an electric motor and a motion conversion mechanism that converts the rotational motion of the electric motor into linear motion of the injection device 300, instead of using the liquid-pressure cylinder 430.

(Control Device)

The control device 700 is composed of a computer, and, as shown in FIG. 1 and FIG. 2, has: a CPU (Central Processing Unit) 701; a memory medium 702 (an example of a memory part) including a memory 706 and a non-volatile memory medium; an input interface 703; an output interface 704; a communication interface 705; and a memory 706. The control device 700 causes the CPU 701 to execute programs (for example, the OS and the control software 702A) stored in the memory medium 702, and performs various controls by using the memory 706 as a work area. Also, the control device 700 receives signals from the outside via the input interface 703, and sends signals to the outside via the output interface 704. Furthermore, the control device 700 sends and receives information to and from an information processing device (for example, a personal computer) connected via a network via the communication interface 705.

The control device 700 repeats the measurement step, the mold-closing step, the pressurizing step, the clamping step, the filling step, the pressure-holding step, the cooling step, the de-pressurizing step, the mold-opening step, the ejection step, and so forth, thereby repeatedly manufacturing the molded product. The series of operations for having a molded product is also referred to as a "shot" or a "molding cycle." This includes, for example, the operation from the start of the measurement step, up to the start of the next measurement step. Also, the time required for one shot is also referred to as a "molding cycle time" or a "cycle time."

One molding cycle is composed of, for example, a measurement step, a mold-closing step, a pressurizing step, a clamping step, a filling step, a pressure-holding step, a cooling step, a de-pressurizing step, a mold-opening step, and an ejection step, performed in this order. This order is the order of starting each step. The filling step, the pressure-holding step, and the cooling step are performed during the clamping step. The start of the clamping step may match the start of the filling step. Also, the end of the de-pressurizing step may match the start of the mold-opening step.

Note that multiple steps may be performed simultaneously in order to shorten the molding cycle time. For example, the measurement step may be performed during the cooling step in the previous molding cycle, or may be performed during the clamping step. In this case, the mold-closing step may be performed at the beginning of the molding cycle. Also, the filling step may be started during the mold-closing step. The ejection step may be started during the mold-opening step. When an on-off valve for opening and closing the channel of the nozzle 320 of the injection device 300 is provided, the mold-opening step may be started during the measurement step. This is because, even if the mold-opening step is started during the measurement step, the molding material does not leak from the nozzle 320 as long as the on-off valve closes the channel of the nozzle 320.

Note that one molding cycle may include steps other than the measurement step, the mold-closing step, the pressurizing step, the clamping step, the filling step, the pressure-holding step, the cooling step, the de-pressurizing step, the mold-opening step, and the ejection step.

For example, after completing the pressure-holding step and before starting the measurement step, a pre-measurement suck-back step may be performed, in which the screw 330 is moved backward to a preconfigured measurement starting position. In this case, the pressure of the molding material accumulated in front of the screw 330 can be reduced before the measurement step is started, so that the screw 330 can be prevented from moving backward all too suddenly at the start of the measurement step.

Also, after completing the measurement step and before starting the filling step, a post-measuring suck-back step may be performed, in which the screw 330 is moved backward to a pre-configured filling starting position (also referred to as the "injection starting position"). In this case, the pressure of the molding material accumulated in front of the screw 330 can be reduced before the filling step is started, so that the molding material is prevented from leaking from the nozzle 320 before the filling step is started.

The control device 700 is connected to an operating device 750 that receives user input operations, and a display device 760 that displays a screen. The operating device 750 and the display device 760 may be configured with a touch panel 770, for example, and may be integrated with the touch panel 770. The touch panel 770, when serving as a display device 760, displays a screen under the control of the control device 700. The screen of the touch panel 770 may display information such as, for example, the settings of the injection molding machine 10, the current state of the injection molding machine 10, and so forth. Also, on the screen of the touch panel 770, for example, operating parts such as buttons for receiving user input operations, input fields, and the like may be displayed. The touch panel 770, when serving as an operating device 750, detects the user's input operations on the screen, and outputs signals corresponding to the input operations to the control device 700. By this means, for example, the user can check the information displayed on the screen, and operate the operating parts displayed on the screen to, for example, configure the injection molding machine 10 (including inputting configuration values). Also, since the user operates the operating parts provided on the screen, the injection molding machine 10 is able to operate in accordance with the operating parts. Note that the operation of the injection molding machine 10 may be, for example, the operation (including a stop) of the clamping device 100, the ejector device 200, the injection device 300, the move device 400, and so forth. Also, the operation of the injection molding machine 10 may be, for example, switching of the screen displayed on the touch panel 770 serving as the display device 760.

Note that, although the operating device 750 and the display device 760 of the present embodiment are described as integrated as a touch panel 770, they may be provided separately as well. Also, multiple operating devices 750 may be provided. The operating device 750 and the display device 760 are positioned on the operating side (the negative Y-axis direction) of the clamping device 100 (to be more specific, the fixed platen 110).

First Embodiment

Figure 3:
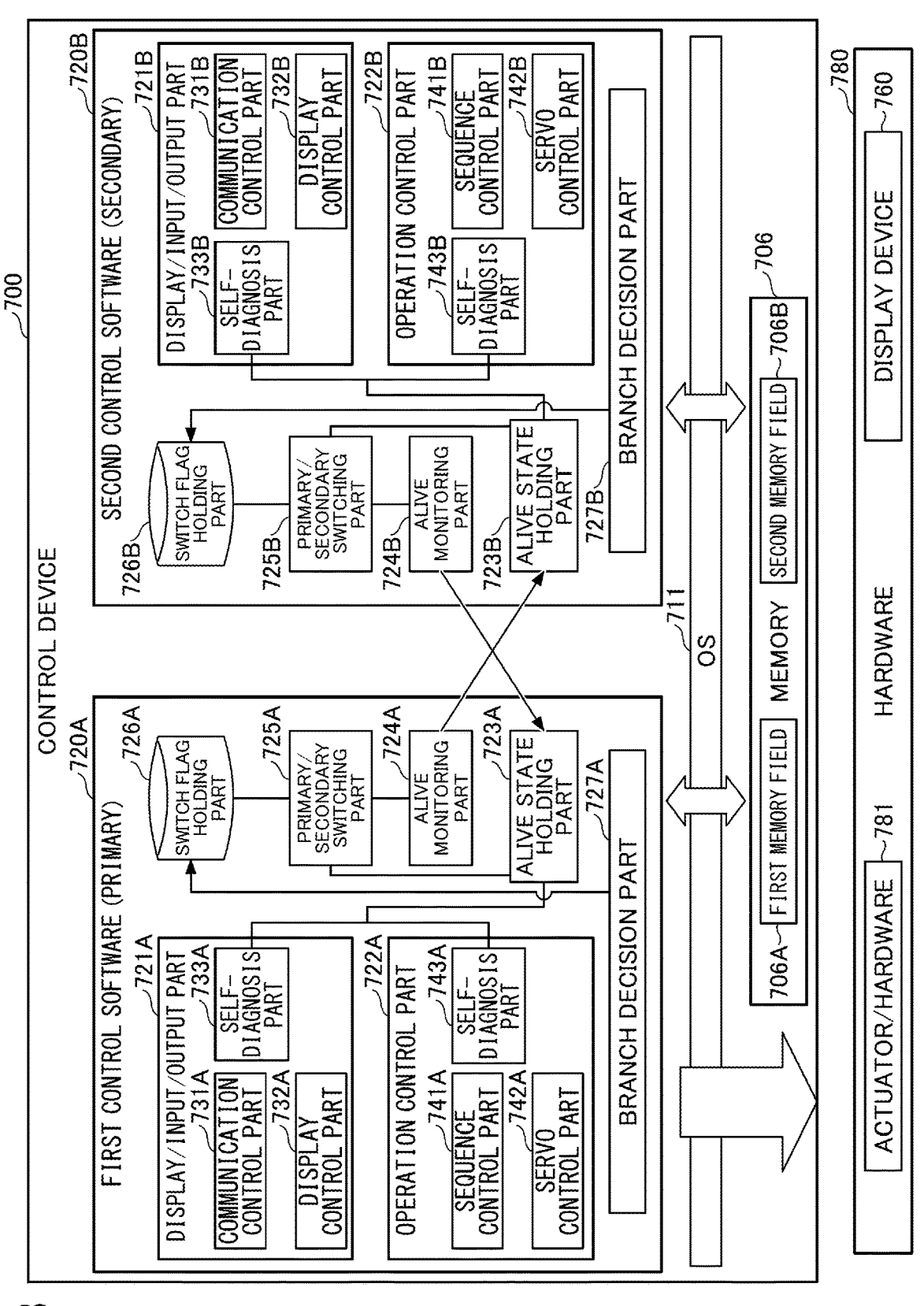
FIG. 3 is a diagram showing components of a control device in functional blocks according to the first embodiment.

FIG. 3 is a diagram showing the components of the control device 700 according to the first embodiment in functional blocks. The functional blocks of the OS 711, the first control software 720A, and the second control software 720B provided in the control device 700 shown in FIG. 3 are simply conceptual, and do not necessarily have to be physically configured as illustrated. All or part of the functional blocks can be functionally or physically distributed or integrated in arbitrary units. All or part of the processing functions performed by each functional block are implemented by programs executed by the CPU 701. Alternatively, each functional block may be implemented as hardware by wired logic.

The OS 711 is the basic software for controlling the control device 700, and is implemented by being executed by the CPU 701 (an example of a control part).

With the control device 700 according to the present embodiment, the OS 711 executes twice the control software 702A (an example of software for controlling an industrial machine) that is stored in the memory medium 702 and controls the injection molding machine 10. The control software 702A may be executed twice based on user operation. Furthermore, a script to describe the process for executing the control software 702A twice may be created in advance and executed by the OS 711. When the OS 711 executes the control software 702A twice, first control software 720A and second control software 720B are implemented in the control device 700. Note that, although the present embodiment describes an example here in which the control software 702A is executed twice, this is by no means limiting, and the control software 702A may be executed three times or more.

In this way, the CPU 701 according to the present embodiment executes the control software 702A for controlling the injection molding machine 10 at least twice, and allows each of a plurality of the same control software (for example, the first control software 720A and the second control software 720B) to perform processes individually.

That is, with the present embodiment, the first control software 720A and the second control software 720B both perform processes. The first control software 720A and the second control software 720B perform the same process at substantially the same time. When the first control software 720A and the second control software 720B perform the same process, a command pertaining to only one process is output to the outside of the control device 700.

Therefore, even if an anomaly occurs in one of the first control software 720A and the second control software 720B, the other one can control the injection molding machine 10. By this means, when an anomaly occurs in the control software, it is still possible to continue controlling the injection molding machine 10 without restarting the control software as has been done in the past.

With the present embodiment, one of the first control software 720A and the second control software 720B is configured as "primary" and the other one is configured as "secondary." Although FIG. 2 shows an example in which the first control software 720A is configured as "primary" and the second control software 720B is configured as "secondary," this configuration is by no means limiting, and, for example, the first control software 720A may be configured as "secondary" and the second control software 720B may be configured as "primary." Also, "primary" and "secondary" may be switched at any time.

The first control software 720A and the second control software 720B according to the present embodiment perform the same process for operating the injection molding machine 10 at substantially the same time. However, only one of the first control software 720A and the second control software 720B actually outputs a command to the hardware 780. With the present embodiment, the control software that is configured as "primary" actually outputs a command to the hardware 780.

That is, with the present embodiment, the control software is executed twice at the same time. Then, the control software that is configured as "primary" actually controls the hardware 780. When an anomaly occurs in the software configured as "primary," the configuration of "primary" is switched. Since the two control software perform the same process at substantially the same time, it is possible to take over the operation quickly. Each component implemented by the control device 700 will be described below.

The memory 706 has: a first memory field 706A where the first control software 720A reads and writes; and a second memory field 706B where the second control software 720B reads and writes. The present embodiment separates the first memory field 706A and the second memory field 706B, so that, even if an anomaly occurs in one of the memory fields, the data stored in the other memory field can be used to continue controlling the injection molding machine 10. Note that, although an example will be described here with the present embodiment where the first memory field 706A and the second memory field 706B are set in different address fields in the actual memory 706, the first memory field 706A and the second memory field 706B may be provided on physically different memories.

Also, the first memory field 706A and the second memory field 706B store the same data as long as no anomaly occurs. As for the method of storing the same data, any method may be used. For example, when storing data received from the hardware 780, the control software that is configured as "primary" (for example, the first control software 720A) may pass the data onto the control software that is configured as "secondary" (for example, the second control software 720B). Upon receiving the data, the "secondary" control software writes the data in the memory field. This enables duplication of data. Given that the same data is stored in the first memory field 706A and the second memory field 706B according to the present embodiment, the control software can be switched with ease.

The first control software 720A and the second control software 720B are programs that operate on the OS 711, and are programs for controlling the hardware 780 of the injection molding machine 10.

The first control software 720A includes: a display/input/output control part 721A; an operation control part 722A; an alive state holding part 723A; an alive monitoring part 724A; a primary/secondary switching part 725A; a switch flag holding part 726A; and a branch decision part 727A. The components of the first control software 720A use the first memory field 706A in the memory 706 as a work area and perform various processes.

The display/input/output control part 721A, including a communication control part 731A, a display control part 732A, and a self-diagnosis part 733A, controls the display of the injection molding machine 10, and controls the input and output of signals with external devices.

The communication control part 731A sends and receives information, via the communication interface 705, to and from external devices connected via a network.

The display control part 732A controls the display of screens on the display device 760.

The self-diagnosis part 733A makes a diagnosis of whether the components of the display/input/output control part 721A (the communication control part 731A and the display control part 732A) are operating properly. Any suitable diagnostic method, known or unknown, may be used here. For example, the self-diagnosis part 733A may check whether each of the communication control part 731A and the display control part 732A is operating (whether each of the communication control part 731A and the display control part 732A has not been forced to a stop by the OS 711) by looking up the address field, and sending/receiving signals, and so forth. Alternatively, the self-diagnosis part 733A may determine this based on whether or not an anomaly has been reported from each of the communication control part 731A and the display control part 732A.

The present embodiment does not limit the anomalies that are subject to diagnosis. For example, the case in which the components of the display/input/output control part 721A tries to look up an illegal address field and is forced to a stop by the OS 711, the case in which the components of the display/input/output control part 721A end in an irregular manner, and so forth are subject to diagnosis. Furthermore, any anomaly may be subject to diagnosis as long as the self-diagnosis part 733A detect such anomaly.

The operation control part 722A includes a sequence control part 741A, a servo control part 742A, and a self-diagnosis part 743A, and controls the hardware operation of the injection molding machine 10.

The sequence control part 741A controls the order of operating the hardware 780 in the process that is currently in progress in the injection molding machine 10. Also, to allow the operation in the process that is currently in progress in the injection molding machine 10, the sequence control part 741A receives as input and outputs signals and the like from and to other components.

The servo control part 742A controls the movement of the actuator/hardware 781 in accordance with control from the sequence control part 741A. The actuator/hardware 781 includes at least the measurement motor 340 and the injection motor 350. Note that the actuator/hardware 781 of the present embodiment is an example of an actuator operated by the servo control part 742A, and any actuator that is subject to control by the control device 700 may be used.

The self-diagnosis part 743A makes a diagnosis of whether or not the components of the operation control part 722A (the sequence control part 741A and the servo control part 742A) are operating properly. The method of diagnosis is the same as that of the self-diagnosis part 733A, and the description thereof will be omitted here.

The alive state holding part 723A holds information for determining whether the first control software 720A can control the hardware 780 of the injection molding machine 10. For example, the alive state holding part 723A may have watchdog timers that correspond to each of the display/input/output control part 721A and the operation control part 722A. In this case, for example, if the alive state holding part 723A does not receive a count-up-clear request from each of the display/input/output control part 721A and the operation control part 722A within a predetermined period of time (for example, before reaching a predetermined value T), the alive state holding part 723A can determine that an anomaly is occurring in the display/input/output control part 721A and/or the operation control part 722A not having cleared the count-up. Note that, although the present embodiment shows an example of using watchdog timers as an example of the means for determining whether or not an anomaly is occurring in each of the display/input/output control part 721A and the operation control part 722A, the method for determining the occurrence of an anomaly is by no means limited to this, and any other determination method may be used.

The alive monitoring part 724A accesses the alive state holding part 723B of the second control software 720B and monitors whether each component of the second control software 720B can control the hardware 780 or not.

To be more specific, the alive monitoring part 724A looks up all the watchdog timers that the alive state holding part 723B of the second control software 720B has, and checks whether or not the counts on these watchdog timers are cleared within a predetermined period of time (for example, before reaching a predetermined value T). Then, the alive monitoring part 724A determines that an anomaly is occurring in the second control software 720B when there is even one watchdog timer where the count is not cleared within the predetermined period of time (for example, before reaching the predetermined value T). Then, when the alive monitoring part 724A determines that an anomaly is occurring in the second control software 720B, the alive monitoring part 724A reports this to the primary/secondary switching part 725A.

The primary/secondary switching part 725A performs switching control of the first control software 720A between "primary" and "secondary." To be more specific, when the first control software 720A is configured as "secondary" and a report indicating that an anomaly is occurring in the second control software 720B arrives from the alive monitoring part 724A, the primary/secondary switching part 725A rewrites the flag that the switch flag holding part 726A holds, which will be described later, from "secondary" to "primary."

The switch flag holding part 726A holds the "primary" flag or the "secondary" flag. The flag that the switch flag holding part 726A holds may be stored on the memory 706 or stored on the memory medium 702.

Depending on the flag the switch flag holding part 726A holds, the branch decision part 727A determines whether or not to output the signals output from each of the display/input/output control part 721A and the operation control part 722A, from the control device 700 to the outside (for example, the hardware 780).

For example, when the branch decision part 727A determines that the switch flag holding part 726A holds the "primary" flag, the branch decision part 727A controls the signals output from each of the display/input/output control part 721A and the operation control part 722A so as to be output from the control device 700 to the outside (for example, the hardware 780).

On the other hand, when determining that the switch flag holding part 726A holds the "secondary" flag, the branch decision part 727A prevents the signals output from each of the display/input/output control part 721A and the operation control part 722A from being output from the control device 700 to the outside (for example, the hardware 780).

The second control software 720B includes: a display/input/output control part 721B; an operation control part 722B; an alive state holding part 723B; an alive monitoring part 724B; a primary/secondary switching part 725B; a switch flag holding part 726B; and a branch decision part 727B. The components of the second control software 720B use the second memory field 706B in the memory 706 as a work area and perform various processes.

The display/input/output control part 721B, including a communication control part 731B, a display control part 732B, and a self-diagnosis part 733B, controls the display of the injection molding machine 10, and controls the input and output of signals with external devices.

Note that the communication control part 731B, the display control part 732B, and the self-diagnosis part 733B in the second control software 720B perform the same processes as the communication control part 731A, the display control part 732A, and the self-diagnosis part 733A of the first control software 720A, and therefore their description will be omitted here.

The operation control part 722B includes a sequence control part 741B, a servo control part 742B, and a self-diagnosis part 743B, and controls the hardware operation of the injection molding machine 10.

Note that the sequence control part 741B, the servo control part 742B, and the self-diagnosis part 743B in the second control software 720B perform the same processes as the sequence control part 741A, the servo control part 742A, and the self-diagnosis part 743A in the first control software 720A, and therefore their description will be omitted here.

The alive state holding part 723E holds information for determining whether the second control software 720B can control the hardware 780 of the injection molding machine 10. For example, the alive state holding part 723B may have watchdog timers that correspond to each of the display/input/output control part 721B and the operation control part 722B. The process performed by the alive state holding part 723B is the same as the process performed by the alive state holding part 723A, and the description thereof will be omitted here.

The alive monitoring part 724B accesses the alive state holding part 723A of the first control software 720A and monitors whether each component of the first control software 720A can control the hardware 780 or not.

To be more specific, the alive monitoring part 724B looks up all the watchdog timers that the alive state holding part 723A of the first control software 720A has, and checks whether or not the counts on these watchdog timers are cleared within a predetermined period of time (for example, before reaching a predetermined value T). Then, the alive monitoring part 724B determines that an anomaly is occurring in the first control software 720A when there is even one watchdog timer where the count is not cleared within the predetermined period of time (for example, before reaching the predetermined value T). Then, when the alive monitoring part 724B determines that an anomaly is occurring in the first control software 720A, the alive monitoring part 724B reports this to the primary/secondary switching part 725B.

The primary/secondary switching part 725B performs switching control of the second control software 720B between "primary" and "secondary." To be more specific, when the second control software 720B is configured as "secondary" and a report indicating that an anomaly is occurring in the first control software 720A arrives from the alive monitoring part 724B, the primary/secondary switching part 725B rewrites the flag that the switch flag holding part 726B holds, which will be described later, from "secondary" to "primary."

The switch flag holding part 726B holds the "primary" flag or the "secondary" flag. The flag that the switch flag holding part 726B holds may be stored on the memory 706 or stored on the memory medium 702.

Depending on the flag the switch flag holding part 726B holds, the branch decision part 727B determines whether or not to output the signals output from each of the display/input/output control part 721B and the operation control part 722B, from the control device 700 to the outside (for example, the hardware 780). For example, when the branch decision part 727B determines that the switch flag holding part 726B holds the "primary" flag, the branch decision part 727B controls the signals output from each of the display/input/output control part 721B and the operation control part 722B to be output from the control device 700 to the outside (for example, the hardware 780).

On the other hand, when determining that the switch flag holding part 726B holds the "secondary" flag, the branch decision part 727B prevents the signals output from each of the display/input/output control part 721B and the operation control part 722B from being output from the control device 700 to the outside (for example, the hardware 780).

That is, the branch decision part 727A and the branch decision part 727B exert control such that a command is output when the "primary" flag is configured, and a command is prevented from being output when the "secondary" flag is configured. The control device 700 according to the present embodiment makes adjustments such that the "primary" flag is configured for one of the first control software 720A and the second control software 720B and the "secondary" flag is configured for the other one.

By this means, one of a plurality of the same control software (the first control software 720A and the second control software 720B) running on the control device 700 according to the present embodiment can output a command for the injection molding machine 10 to perform the molding operations. Also, even when multiple control software (the first control software 720A and the second control software 720B) are executed, it is possible to prevent outputting multiple commands to the hardware 780 of the injection molding machine 10. Therefore, it is possible to prevent the hardware 780 of the injection molding machine 10 from being confused by receiving multiple commands, and allow the hardware 780 of the injection molding machine 10 to respond appropriately to the command from the control device 700.

With the present embodiment, the first control software 720A has the alive monitoring part 724A that monitors the second control software 720B, and the second control software 720B has the alive monitoring part 724B that monitors the first control device 72A, thus monitoring each other to determine whether or not an anomaly is occurring. By this means, the first control software 720A and the second control software 720B can each identify an anomaly when it occurs with the other control software. That is, one control software without an anomaly can identify an anomaly in the other control software.

When the alive monitoring part 724A or the alive monitoring part 724B determines that an anomaly is occurring in the other control software, the branch decision part 727A or the branch decision part 727B starts outputting a command if the first control software 720A or the second control software 720B (examples of a plurality of same software) is not outputting a command at that time. Therefore, by starting outputting a command, the first control software 720A and the second control software 720B according to the present embodiment can prevent the troubled control software from continuing controlling the injection molding machine 10, and allow proper control software to take over the control of the molding machine 10. Because the control software that is already running takes over the control, it is possible to avoid delays in the switching of control software. That is, output of commands can be taken over without requiring time to switch the control software, so that the safety can be improved.

As described above, the first control software 720A and the second control software 720B according to the present embodiment monito each other to determine whether or not an anomaly is occurring. When an anomaly occurs in the control software that is configured as "primary," the control software that is configured as "secondary" identifies the anomaly and performs control to switch to "primary."

Figure 4:
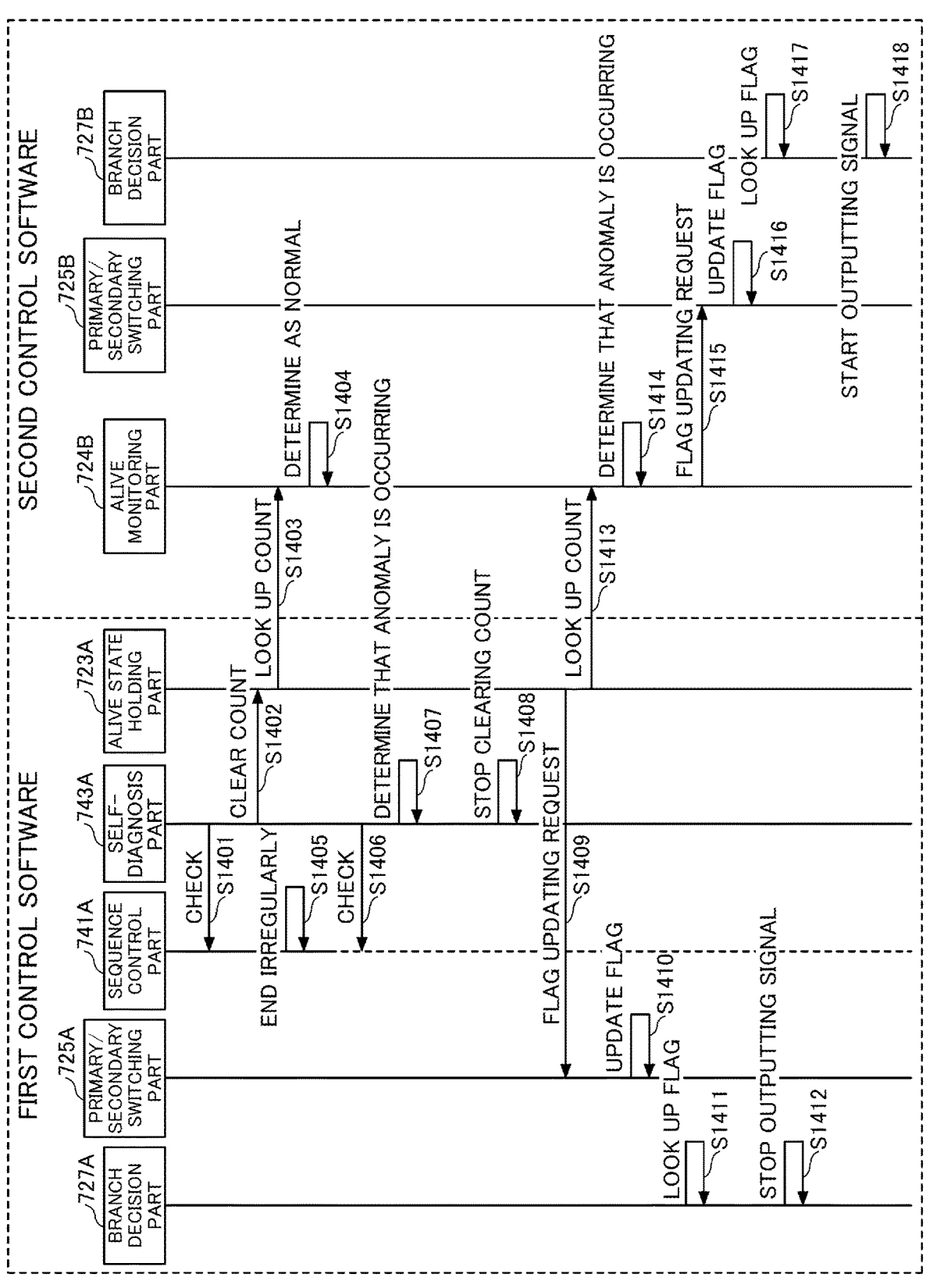
FIG. 4 is a sequence diagram showing a flow of processes performed by first control software and second control software when an anomaly occurs in the first control software, according to the first embodiment.

Next, the process that is performed when an anomaly occurs in the "primary" first control software 720A while mutual monitoring is being performed between the first control software 720A and the second control software 720B according to the present embodiment will be described below. FIG. 4 is a sequence diagram showing a flow of processes that the first control software 720A and the second control software 720B perform when an anomaly occurs in the first control software 720A, according to the present embodiment.

First, the self-diagnosis part 743A of the operation control part 722A checks whether or not an anomaly is occurring in each component (for example, the sequence control part 741A) in the operation control part 722A (S1401). In S1401, the self-diagnosis part 743A determines that the sequence control part 741A is normal.

Note that, in the example shown in FIG. 4, whether an anomy is occurring in the sequence control part 741A is checked. Note that what the self-diagnosis part 743A checks is by no means limited to the sequence control part 741A, and may target all components of the operation control part 722A including the servo control part 742A. The self-diagnosis part 733A of the display/input/output control part 721A also checks whether or not an anomaly is occurring, with respect to all components in the display/input/output control part 721A. Furthermore, the self-diagnosis part 733B and the self-diagnosis part 743B in the second control software 720B also perform the same checking, but the description thereof will be omitted here.

Now that the self-diagnosis part 743A of the operation control part 722A determines that each component is normal, the alive state holding part 723A is commanded to clear the counts on the watchdog timers that the alive state holding part 723A has (S1402).

The alive monitoring part 724B of the second control software 720B looks up the counts on the watchdog timers that the alive state holding part 723A of the first control software 720A has (S1403). When the counts are cleared, the alive monitoring part 724B of the second control software 720B determines that the watchdog timers of the alive state holding part 723A of the first control software 720A are normal (S1404).

Subsequently, the sequence control part 741A ends in an irregular manner (S1405). Note that the manner of irregular ending is not particularly limited, and any manner of irregular ending might apply here.

The self-diagnosis part 743A of the operation control part 722A checks whether or not an anomaly is occurring in each component (for example, the sequence control part 741A) in the operation control part 722A (S1406). Then, the self-diagnosis part 743A determines that an anomaly is occurring in the sequence control part 741A (S1407).

The self-diagnosis part 743A of the operation control part 722A stops clearing the counts on the watchdog timers that the alive state holding part 723A has (S1408). By this means, the counts on these watchdog timers are not cleared within a predetermined period of time (for example, before reaching a predetermined value T), so that the alive state holding part 723A comes to notice that the operation control part 722A is in a troubled state.

The alive state holding part 723A determines that the troubled state has occurred because the counts on the watchdog timers are not cleared, and issues a flag updating request to the primary/secondary switching part 725A (S1409).

In response to the updating request from the alive state holding part 723A, the primary/secondary switching part 725A switches the flag that the switch flag holding part 726A holds, from "primary" to "secondary" (S1410).

The branch decision part 727A looks up the flag that the switch flag holding part 726A holds (S1411). When seeing the "secondary" flag, the branch decision part 727A stops outputting signals from each of the display/input/output control part 721A and the operation control part 722A to the hardware 780 (S1412).

On the other hand, the alive monitoring part 724B of the second control software 720B looks up the counts on the watchdog timers that the alive state holding part 723A of the first control software 720A has (S1413). When the counts are not cleared, the alive monitoring part 724B of the second control software 720B determines that an anomaly is occurring in the watchdog timers of the alive state holding part 724B of the second control software 720B (S1414).

The alive monitoring part 724B of the second control software 720B issues a flag updating request (anomaly report) to the primary/secondary switching part 725B (S1415).

In response to the updating request of the alive state holding part 723B, the primary/secondary switching part 725B switches the flag that the switch flag holding part 726B holds from "secondary" to "primary" (S1416).

The branch decision part 727B looks up the flag that the switch flag holding part 726B holds (S1417). Upon seeing the "primary" flag, the branch decision part 727B starts outputting signals from each of the display/input/output control part 721B and the operation control part 722B, to the hardware 780 (S1418).

According to the present embodiment, the first control software 720A and the second control software 720B monitor each other, and switch between "primary" and "secondary" when necessary, so that the normal control software between the first control software 720A and the second control software 720B can control the operation of the injection molding machine 10. By this means, it is possible to prevent control software in which an anomaly occurs from causing an anomaly in the molding operations, and quickly switch the control software with the anomaly to normal control software, so that it is possible to reduce the time in which no software control is executed, and thus achieve improved safety.

Also, with the injection molding machine 10 according to the present embodiment, if the control software is switched while the molding operations is in progress, there is a possibility that the control of the molding operations will go wrong due to the switching.

Therefore, according to the present embodiment, when, where there are the first control software 720A and the second control software 720B, it is determined that an anomaly occurring in the first control software 720A (an example of one control software), and the output of commands to the hardware 780 of the injection molding machine 10 switches from the first control software 720A to the second control software 720B (an example of the other control software) based on this result of determination, the display control part 732A of the second control software 720B sends an output indicating that the product molded at the time of the switching is defective, to the display device 760.

Note that, according to the present embodiment, the output to indicate that the molded product is defective does not have to be presented via the display device 760. For example, if the memory medium 702 holds information about the molded product, the display/input/output control parts 721A and 721B may write, into the information, that the product molded at the switching time is defective. Note that the present embodiment by no means limits the output indicating that the molded product is defective to the display device 760, and the memory medium 702, and other devices may be used as well. By outputting an indication that the product molded at the time of switching is defective, it is possible to remove the molded products that have become defective due to switching of control software, so that the quality of molded products can be improved.

Second Embodiment

A case has been described with the first embodiment where the first control software 720A and the second control software 720B each have a component for monitoring whether or not an anomaly is occurring, thereby making possible mutual monitoring. However, the method of determining whether or not an anomaly is occurring is by no means limited to monitoring, and each component may determine, by itself, whether or not an anomaly is occurring. Therefore, a case will be described below with the second embodiment where each component determines whether or not an anomaly is occurring, by itself, will be described. Note that the components of the control device 700 according to the second embodiment are the same as in the first embodiment, and their description will be therefore omitted here.

Each component that serves as an element of the first control software 720A and the second control software 720B according to the present embodiment (examples of a plurality of same software) determines whether or not an anomaly is occurring in its hosting software. According to the present embodiment, each component determines whether or not an anomy is occurring in its hosting software, so that it is possible to appropriately detect anomalies that cannot be detected from other software, and quickly switch the control software according to the anomaly that occurs. By this means, according to the present embodiment, improved safety can be achieved. Next, a specific configuration will be described.

In the present embodiment, when a component of the first control software 720A and the second control software 720B determines that an anomaly is occurring, that component reports, to the self-diagnosis part 733A, 743A, 733B, or 743B associated with that component, that an anomaly has occurred.

As for what anomaly each component identifies, for example, a case might occur in which information stored in the first memory field 706A or the second memory field 706B has a problem. For example, when a value stored in the first memory field 706A is updated to an abnormal value due to noise or the like, a component that sees this value reports to the self-diagnosis parts 733A and 743A that anomaly has occurred. When such a report is issued, according to the present embodiment, a process is performed so that "primary" and "secondary" are switched.

Figure 5:
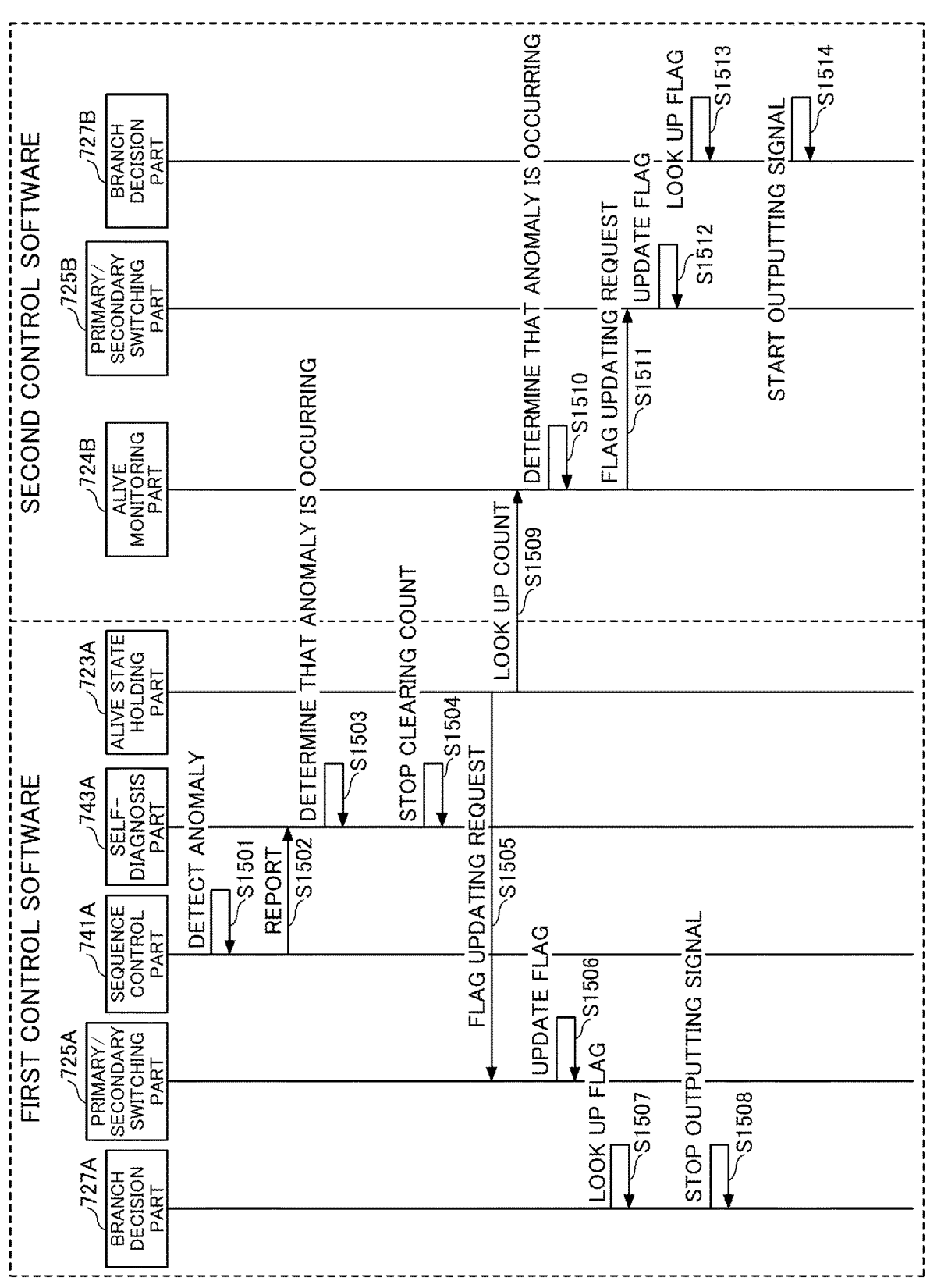
FIG. 5 is a sequence diagram showing a flow of processes performed by the first control software and the second control software when an anomaly occurs in the first control software, according to a second embodiment.

FIG. 5 is a sequence diagram showing a flow of processes performed by the first control software 720A and the second control software 720B when an anomaly occurs in the first control software 720A, according to the present embodiment.

First, the sequence control part 741A detects an anomaly from information read from the first memory field 706A (S1501). For example, where a value might range from "0" to "100," the value actually read may be "452."

Then, the sequence control part 741A reports to the self-diagnosis part 743A that an anomaly has occurred (S1502).

The example shown in FIG. 5 illustrates a case where the value read by the sequence control part 741A indicates an anomaly. The component for reporting when there is a problem with read values is by no means limited to the sequence control part 741A, as long as the component is one in the operation control part 722A and the display/input/output control part 721A. Also, the components of the operation control part 722B inside the second control software 720B and the display/input/output control part 721B are capable of the same process.

Then, the self-diagnosis part 743A determines that an anomaly has occurred in the sequence control part 741A (S1503).

The self-diagnosis part 743A stops clearing the counts on the watchdog timers that the alive state holding part 723A has (S1504). By this means, the watchdog timers are not cleared within a predetermined period of time (for example, before reaching a predetermined value T), so that the alive state holding part 723A comes to notice that an anomaly has occurred in the operation control part 722A.

The steps S1505 to S1514, performed subsequently up to when the second control software 720B starts outputting signals, are the same as S1409 to S1418 in FIG. 4.

The present embodiment has described a case where an irregular value is read from the first memory field 706A. However, the present embodiment by no means limits the condition for each component to identify an anomaly to the case where an irregular value is read (that is, the case where a value that is read is not included in a pre-configured range), or, in other words, to the case where an anomaly occurs in the first memory field 706A. According to the present embodiment, any anomaly may be applicable here as long as each component of control software can identify the anomaly based on self-diagnosis.

With the present embodiment, an anomaly is detected based on results of self-determination by the components of the first control software 720A and the second control software 720B, and "primary" and "secondary" are switched between control software. By means of the above control, the present embodiment can, in addition to bringing about the effect illustrated with the first embodiment, switch the control software even if an anomaly that cannot be identified from outside the above components occurs. By this means, the stability of the molding operations performed in the injection molding machine 10 can be improved.

Third Embodiment

Cases have been described with the above embodiments in which each control software carries out monitoring to determine whether or not an anomaly is occurring. However, the above embodiments do not limit the way the control software performs the monitoring. Therefore, with a third embodiment, an example in which a separate monitoring component is provided will be described.

Figure 6:
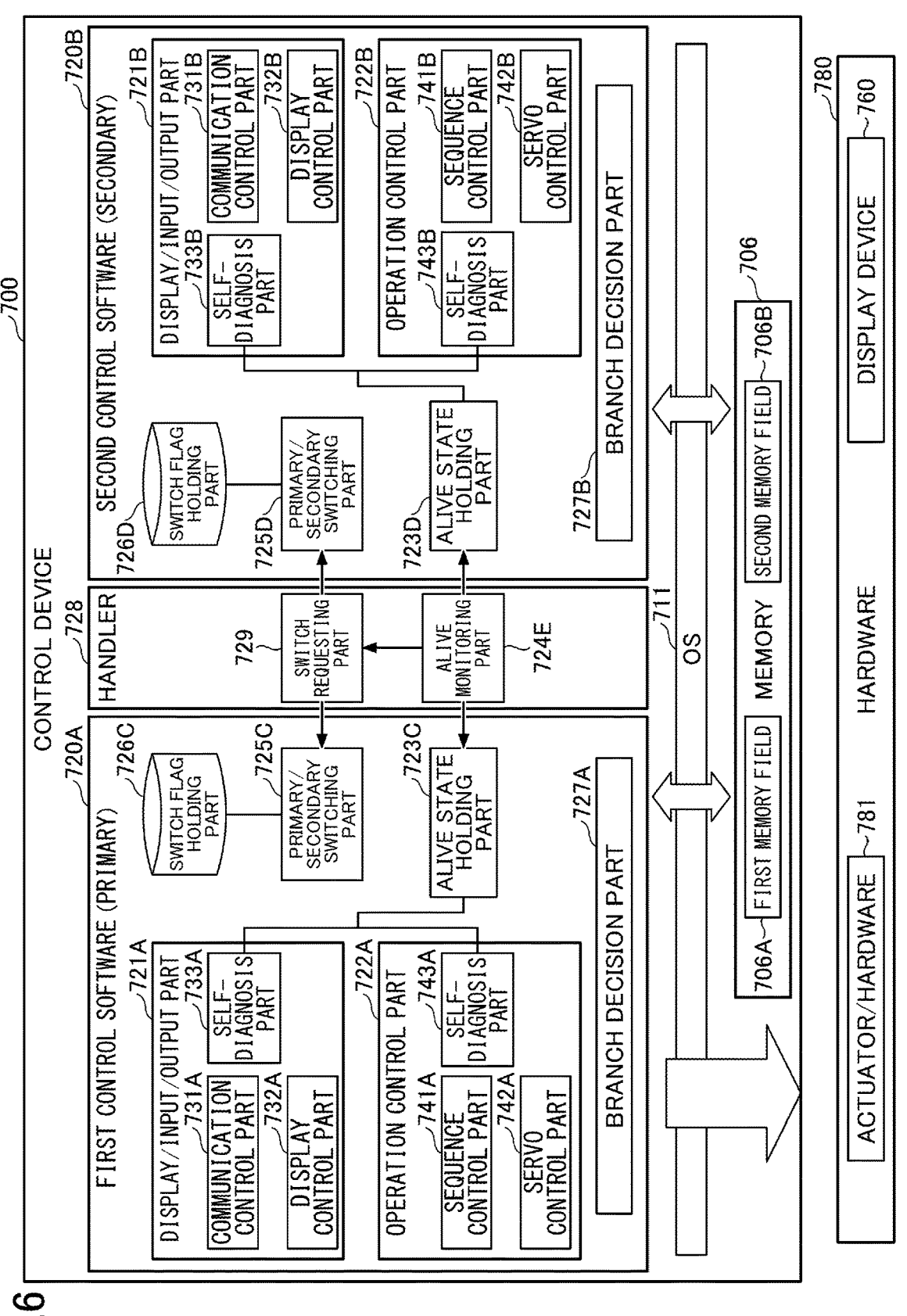
FIG. 6 is a functional block diagram showing components of a control device according to a third embodiment.

FIG. 6 is a functional block diagram showing the components of the control device 700 according to the third embodiment. The functional blocks of the OS 711, the first control software 720C, the second control software 720D, and the handler 728 provided in the control device 700 shown in FIG. 6 are simply conceptual, and do not necessarily have to be physically configured as illustrated. All or part of the functional blocks can be functionally or physically distributed or integrated in arbitrary units. All or part of the processing functions performed by each functional block are implemented by programs executed by the CPU 701. Alternatively, each functional block may be implemented as hardware by wired logic. Note that, among the components provided in the control device 700 of the third embodiment, components that are the same or similar to those of the first embodiment will be assigned the same reference numerals, and their description will be omitted.

With the control device 700 according to the present embodiment, the OS 711 executes twice the control software 702A that is stored in the memory medium 702 and controls the injection molding machine 10. When the OS 711 executes the control software 702A twice, first control software 720C and second control software 720D are implemented in the control device 700. Also, as the OS 711 executes a handler-related program stored in the memory medium 702, a handler 728 is implemented in the control device 700.

Also, with the present embodiment, again, one of the first control software 720C and the second control software 720D is configured as "primary," and the other one is configured as "secondary." Although FIG. 6 shows an example in which the first control software 720C is configured as "primary" and the second control software 720D is configured as "secondary," this configuration is by no means limiting, and, for example, the first control software 720C may be configured as "secondary" and the second control software 720D may be configured as "primary." Also, "primary" and "secondary" may be switched at any time.

The first control software 720C and the second control software 720D according to the present embodiment perform the same process for operating the injection molding machine 10 at substantially the same time. However, only one of the first control software 720C and the second control software 720D actually outputs a command to the hardware 780. With the present embodiment, the control software that is configured as "primary" actually outputs a command to the hardware 780.

The first control software 720C and the second control software 720D are programs that operate on the OS 711, and are programs for controlling the hardware 780 that the injection molding machine 10 has.

The first control software 720C includes: a display/input/output control part 721A; an operation control part 722A; an alive state holding part 723C; a primary/secondary switching part 725C; a switch flag holding part 726C; and a branch decision part 727A. The components of the first control software 720A use the first memory field 706A in the memory 706 as a work area and perform various processes.

The alive state holding part 723C holds information indicating whether the first control software 720C can control the hardware 780 of the injection molding machine 10. For example, like the embodiments described above, the alive state holding part 723C may have watchdog timers that correspond to each of the display/input/output control part 721A and the operation control part 722A.

The primary/secondary switching part 725C performs switching control of the first control software 720C between "primary" and "secondary" based on a switch request from the handler 728.

The switch flag holding part 726C holds the "primary" flag or the "secondary" flag.

As in the first embodiment, depending on the flag the switch flag holding part 726C holds, the branch decision part 727A determines whether or not to output the signals output from each of the display/input/output control part 721A and the operation control part 722A, from the control device 700 to the outside (for example, the hardware 780).

The second control software 720B includes: a display/input/output control part 721B; an operation control part 722B; an alive state holding part 723D; a primary/secondary switching part 725D; a switch flag holding part 726D; and a branch decision part 727B. The components of the second control software 720D use the second memory field 706B in the memory 706 as a work area and perform various processes.

The alive state holding part 723D holds information indicating whether the second control software 720B can control the hardware 780 of the injection molding machine 10. For example, like the embodiments described above, the alive state holding part 723D may have watchdog timers that correspond to each of the display/input/output control part 721B and the operation control part 722B.

The primary/secondary switching part 725D performs switching control of the first control software 720D between "primary" and "secondary" based on a switch request from the handler 728.

The switch flag holding part 726D holds the "primary" flag or the "secondary" flag.

Then, as in the first embodiment, depending on the flag the switch flag holding part 726D holds, the branch decision part 727B determines whether or not to output the signals output from each of the display/input/output control part 721B and the operation control part 722B, from the control device 700 to the outside (for example, the hardware 780).

The handler 728 (an example of the monitoring part) includes an alive monitoring part 724E and a switch requesting part 729, and monitors whether an anomy is occurring in each of the first control software 720C and the second control software 720D.

That is, the alive monitoring part 724E monitors whether an anomaly is occurring in each of the first control software 720C and the second control software 720D, or, in other words, whether the hardware 780 can be controlled.

To be more specific, the alive monitoring part 724E accesses the alive state holding part 723C of the first control software 720C, and monitors whether each component of the first control software 720C can control the hardware 780 or not. Similarly, the alive monitoring part 724E accesses the alive state holding part 723D of the second control software 720D, and monitors whether each component of the second control software 720D can control the hardware 780 or not.

To be more specific, the alive monitoring part 724E looks up all the watchdog timers that the alive state holding part 723C of the first control software 720C has, and also looks up all the watchdog timers that the alive state holding part 723D of the second control software 720D has. Then, the alive monitoring part 724E checks whether or not the counts on all the watchdog timers are cleared within a predetermined period of time (for example, before reaching a predetermined value T).

Then, the alive monitoring part 724E determines that an anomaly is occurring in the first control software 720C when there is even one watchdog timer where the count is not cleared within the predetermined period of time (for example, before reaching the predetermined value T) among all the watchdog timers that the alive state holding part 723C of the first control software 720C has.

Then, when the alive monitoring part 724A determines that an anomaly is occurring in the first control software 720C, the alive monitoring part 724E reports to the switch requesting part 729 that an anomaly is occurring in the first control software 720C.

Then, the alive monitoring part 724E determines an anomaly is occurring in the second control software 720D when there is even one watchdog timer where the count is not cleared within a predetermined period of time (for example, before reaching a predetermined value T) among all the watchdog timers that the alive state holding part 723D of the second control software 720D has.

Then, when the alive monitoring part 724E determines that an anomaly is occurring in the second control software 720D, the alive monitoring part 724E reports to the switch requesting part 729 that an anomaly is occurring in the second control software 720D.

In response to the report from the alive monitoring part 724E, the switch requesting part 729 sends a request to switch between "primary" and "secondary" to each of the control software 720C and 720D.

For example, when a report to indicate that an anomaly is occurring in the first control software 720C is received while the first control software 720C is "primary," the switch requesting part 729 sends a switch request to the primary/ secondary switching part 725C of the first control software 720C and to the primary/secondary switching part 725D of the second control software 720D. By this means, the second control software 720D becomes "primary," and the first control software 720C becomes "secondary," so that the molding process can be continued.

For example, when a report to indicate that an anomaly is occurring in the second control software 720D is received while the second control software 720D is "primary," the switch requesting part 729 sends a switch request to the primary/secondary switching part 725C of the second control software 720D and to the primary/secondary switching part 725D of the second control software 720D. By this means, the second control software 720D becomes "primary," and the second control software 720D becomes "secondary," so that the molding process can be continued.

Figure 7:
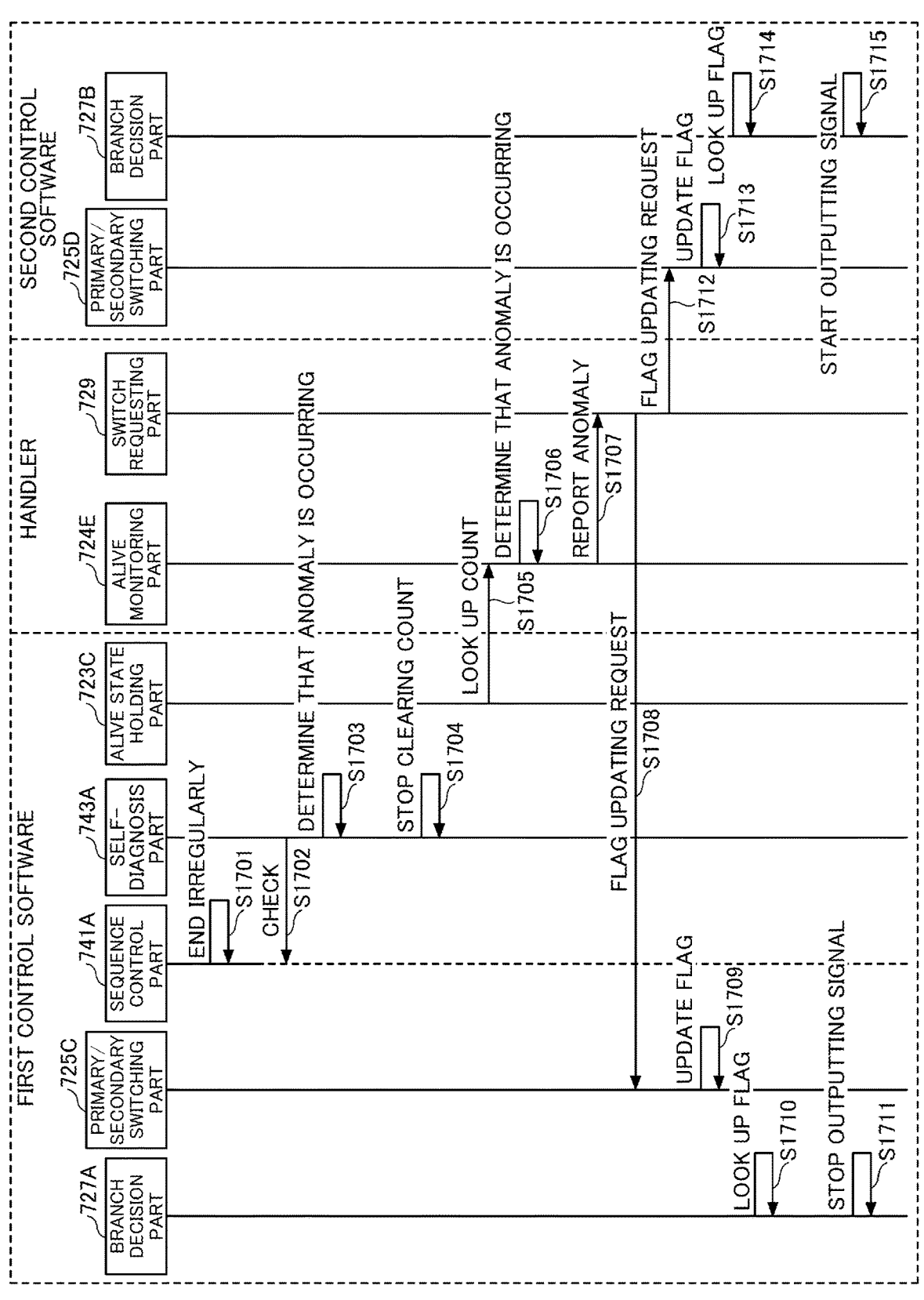
FIG. 7 is a sequence diagram showing a flow of processes performed by the first control software, the second control software, and a handler when an anomaly occurs in the first control software according to the third embodiment.

Next, the process that is performed when an anomaly occurs in the "primary" first control software 720A while the handler 728 according to the present embodiment monitors the first control software 720C and the second control software 720D will be described. FIG. 7 is a sequence diagram showing a flow of processes performed by the first control software 720C, the second control software 720D, and the handler 728 according to the present embodiment, when an anomaly occurs in the first control software 720C.

First, the sequence control part 741A ends in an irregular manner (S1701).

Next, the self-diagnosis part 743A of the operation control part 722A checks whether or not an anomaly is occurring in each component (for example, the sequence control part 741A) in the operation control part 722A (S1702). Then, the self-diagnosis part 743A determines that an anomaly is occurring in the sequence control part 741A (S1703).

The self-diagnosis part 743A of the operation control part 722A stops clearing the counts on the watchdog timers that the alive state holding part 723C has (S1704). By this means, the counts on these watchdog timers are not cleared within a predetermined period of time (for example, before reaching a predetermined value T), so that the alive state holding part 723C comes to notice that the operation control part 722A is in a troubled state.

The alive monitoring part 724E of the handler 728 looks up the alive state holding part 723C of the first control software 720C and the alive state holding part 723D of the second control software 720D (S1705). The counts on the watchdog timers of the alive state holding part 723C of the first control software 720C are not cleared, and therefore the alive monitoring part 724E determines that an anomaly has occurred (S1706).

The alive monitoring part 724E reports to the switch requesting part 729 that an anomaly is occurring in the first control software 720C (S1707). Upon receiving the report, the switch requesting part 729 determines that "primary" and "secondary" need to be switched because the first control software 720C is "primary."

The switch requesting part 729 issues a flag updating request to the primary/secondary switching part 725C of the first control software 720C (S1708).

In response to the updating request, the primary/secondary switching part 725C of the first control software 720C switches the flag the switch flag holding part 726C holds from "primary" to "secondary." (S1709).

The branch decision part 727A of the first control software 720C looks up the flag the switch flag holding part 726C holds (S1710). When seeing the "secondary" flag, the branch decision part 727A stops outputting signals from each of the display/input/output control part 721A and the operation control part 722A to the hardware 780 (S1711).

Also, the switch requesting part 729 issues a flag updating request to the primary/secondary switching part 725D of the second control software 720D (S1712).

In response to the updating request, the primary/secondary switching part 725D switches the flag the switch flag holding part 726D holds from "secondary" to "primary." (S1713).

The branch decision part 727B of the second control software 720D looks up the flag the switch flag holding part 726D holds (S1714). When seeing the "primary" flag, the branch decision part 727B stops outputting signals from each of the display/input/output control part 721D and the operation control part 722D to the hardware 780 (S1715).

According to the present embodiment, the handler 728 monitors the first control software 720C and the second control software 720D and switches between "primary" and "secondary" as necessary, so that the normal control software between the first control software 720C and the second control software 720D can control the operation of the injection molding machine 10. By this means, it is possible to prevent control software in which an anomaly occurs from causing an anomaly in the molding operations, and quickly switch the control software with the anomaly to normal control software, so that it is possible to reduce the time in which no software control is executed, and thus achieve improved safety.

Also, according to the present embodiment, the handler 728 is provided, apart from the control software, as a component for monitoring whether or not an anomaly is occurring. By this means, even if an anomaly occurs in the control software and normal operation is not possible, the handler 728 can appropriately detect the anomaly.

The anomalies to be detected by the handler 728 according to the present embodiment are by no means limited to irregular ending of control software components. Any anomaly may be applicable here as long as the handler 728 can detect such anomaly.

The anomaly detection illustrated in the above embodiments is simply an example, and any anomaly may be applicable, whether it is in software or hardware, as long as it is detectable.

Although examples of executing the control software 702A have been described with the above embodiments as an example of software for controlling an industrial machine, the software for controlling an industrial machine is by no means limited to the control software 702A for controlling the operation of the injection molding machine 10, and may be any software that controls industrial machines.

In the above-described embodiments, the control device 700 executes the control software a number of times, so that a plurality of control software perform processes for controlling the operation of the injection molding machine 10 at substantially the same time. By this means, the control software can be made redundant.

Cases have been described with the above embodiments in which a plurality of control software perform processes at substantially the same time. However, the above-described embodiments are by no means limit to the case where a plurality of control software perform processes at substantially the same time. For example, where there are a plurality of control software, the control software that is configured as "secondary" may perform processes at slightly delayed times compared to the control software that is configured as "primary." The delay time may be determined according to the mode of implementation. By this means, when a command cannot be output because the "primary" control software ends in an irregular manner, the command can be output by quickly switching the control software.

Examples have been described with the above embodiments in which one of a plurality of control software outputs commands. However, the embodiments described above are by no means limited to the mode in which one of a plurality of control software outputs commands, and a plurality of control software may all output commands. For example, if the hardware 780 receives the same command from multiple control software at substantially the same time, the process in response to this command may be carried out only once.

Furthermore, according to the embodiments described above, when an anomaly occurs in one of a plurality of control software, another control software can take over the operation control for the injection molding machine 10. By this means, the molding operations of the injection molding machine 10 can be stabilized, and the time the control software is unable to control the injection molding machine 10 can be reduced, so that improved safety can be achieved.

Although embodiments of the injection molding machine according to the present invention have been described above, the present invention is by no means limited to the above embodiments. Various changes, modifications, substitutions, additions, deletions, and combinations are possible within the scope of the claims. These also naturally belong to the technical scope of the present invention.

What is claimed is:

1. A control device for an industrial machine, the control device comprising:
    a memory part configured to store first software and second software; the first software and the second software controlling the industrial machine to repeat a molding operation; the first software including a first process, and the second software including a second process; and
    a processor configured to:
        execute the first software to perform the first process; and
        execute the second software to perform the second process,
        wherein the first process and the second process are identical,
        wherein the first software and the second software are generated by executing a single control program stored in the memory part at least twice, and have an identical algorithm, and
        wherein the processor is further configured to execute the second software to perform the second process concurrently with the execution of the first software.

2. The control device for the industrial machine according to claim 1, wherein the first software or the second software outputs a command that causes the industrial machine to perform the molding operation.

3. The control device for the industrial machine according to claim 2, wherein the first software monitors the second software as to whether an anomaly occurs in the second software, and the second software monitors the first software as to whether an anomaly occurs in the first software.

4. The control device for the industrial machine according to claim 2, wherein the processor is configured to monitor each of the first software and the second software as to whether an anomaly occurs in each of the first software and the second software.

5. The control device for the industrial machine according to claim 2, wherein the first software determines whether an anomaly occurs in the first software, and the second software determines whether an anomaly occurs in the second software.

6. The control device for the industrial machine according to claim 2, wherein,
    the first software does not output the command before an occurrence of an anomaly is determined in the second software; and the first software starts outputting the command, in response to the determination of the occurrence of the anomaly.

7. The control device for the industrial machine according to claim 6, wherein, when the occurrence of the anomaly is determined in the second software and the outputting of the command is switched to the first software, the first software outputs an indication that a product molded at a time of the switching is defective.

8. A control method for an industrial machine that repeats a molding operation, the method comprising:

executing first software and second software; the first software and the second software controlling the industrial machine; the first software and the second software stored in a memory part; the first software including a first process, and the second software including a second process;

causing the first software to perform the first process; and causing the second software to perform the second process, wherein the first process and the second process are identical, wherein the first software and the second software are generated by executing a single control program stored in the memory part at least twice, and have an identical algorithm, and wherein the control method further comprises executing the second software to perform the second process concurrently with the execution of the first software.

9. The control device for the industrial machine according to claim 1, wherein the first software performs the first process and the second software performs the second process at substantially a same time.

10. The control device for the industrial machine according to claim 1, wherein the first software outputs a first command that causes the industrial machine to perform the molding operation, wherein the processor is configured to cause a second command to be output from the second software, when an anomaly is determined in the first software, and to output, to outside of the control device, information indicating that a switch has occurred from output of the first command to output of the second command; and wherein the output of the information is performed at the time that the switch occurred.

11. The control device for the industrial machine according to claim 1, wherein the memory part includes a first memory field and a second memory field;

the first software reads and writes in the first memory field; and the second software reads and writes in the second memory field.

12. A control device for an industrial machine, the control device comprising:

a memory part configured to store software that controls the industrial machine to repeat a molding operation; and a processor configured to execute the software at least twice so that a process is performed by each of a plurality of same software;

wherein one of the plurality of same software outputs a first command that causes the industrial machine to perform the molding operation;

wherein the processor is configured to output a second command from another software of the plurality of same software, when an anomaly is determined in the one software, and to output, to outside of the control device, information indicating that a switch has occurred from output of the first command to output of the second command; and wherein the output of the information is performed at the time that the switch occurred, wherein the first process and the second process are identical, wherein the first software and the second software are generated by executing a single control program stored in the memory part at least twice, and have an identical algorithm, and wherein the processor is further configured to execute the second software to perform the second process concurrently with the execution of the first software.

13. The control device for the industrial machine according to claim 12, wherein the memory part has a plurality of memory fields; and wherein the plurality of same software reads and writes in different memory fields among the plurality of memory fields.

* * * * *